US007715984B2

(12) United States Patent
Ramakrishnan et al.

(10) Patent No.: US 7,715,984 B2
(45) Date of Patent: May 11, 2010

(54) METHOD FOR CONTINUOUS INTERPRETATION OF MONITORING DATA

(75) Inventors: Terizhandur S. Ramakrishnan, Boxborough, MA (US); Bhavani Raghuraman, Wilton, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 11/935,202

(22) Filed: Nov. 5, 2007

(65) Prior Publication Data
US 2008/0065332 A1 Mar. 13, 2008

Related U.S. Application Data

(62) Division of application No. 11/145,424, filed on Jun. 3, 2005, now abandoned.

(60) Provisional application No. 60/577,269, filed on Jun. 4, 2004.

(51) Int. Cl.
G01V 1/28 (2006.01)
G01N 15/08 (2006.01)
G06F 19/00 (2006.01)
G06F 17/40 (2006.01)

(52) U.S. Cl. .................... 702/11; 73/152.01; 73/152.02; 73/152.05; 73/152.51; 73/152.52; 73/152.53; 702/1; 702/2; 702/6; 702/127; 702/189

(58) Field of Classification Search ................ 73/12.01, 73/12.08, 32 R, 32 A, 37, 38, 152.01, 152.02, 73/152.05, 152.16, 152.51, 152.52, 152.53, 73/570, 596, 597, 599; 175/40, 50; 181/101, 181/108, 113, 122; 702/1, 2, 6, 11, 14, 127, 702/189
See application file for complete search history.

(56) References Cited
U.S. PATENT DOCUMENTS

| 2,989,726 | A | * | 6/1961 | Crawford et al. ............... 367/41 |
| 3,268,858 | A | * | 8/1966 | Winter ......................... 367/25 |
| 3,292,143 | A | * | 12/1966 | Russell ........................ 367/30 |
| 3,338,094 | A | * | 8/1967 | Johnson et al. ........... 73/152.37 |
| 3,376,950 | A | * | 4/1968 | Grine .......................... 367/28 |
| 3,435,195 | A | * | 3/1969 | Loper ......................... 708/813 |
| 3,550,074 | A | * | 12/1970 | Kerns et al. ................... 367/42 |
| 4,148,359 | A |   | 4/1979 | Laumbach et al. |
| 6,009,043 | A |   | 12/1999 | Chon et al. |

(Continued)

OTHER PUBLICATIONS

Brigham W.E., "Planning and Analysis of Pulse-Tests", Journal of Petroleum Technology, May 1970, pp. 618-624, SPE 2417.

(Continued)

Primary Examiner—Edward R Cosimano
(74) Attorney, Agent, or Firm—James M. McAleenan; Vincent P. Loccisano; Brigid M. Laffey

(57) ABSTRACT

It is shown that a pressure pulse originating in a well is correlated to a pulse observed at a distant well with a characteristic time. The correlation time is directly related to the diffusion time scale arising out of the pressure diffusion equation. The relationship is affected by the source-observer or observer-observer distance but the correction is small for large distances. In practice, further corrections have to be included for finite width pulses. For these pulses, a practical scheme for continuous permeability monitoring is presented.

18 Claims, 19 Drawing Sheets

U.S. PATENT DOCUMENTS

| | | | |
|---|---|---|---|
| 6,456,566 | B1 | 9/2002 | Aronstam |
| 6,591,201 | B1 | 7/2003 | Hyde |
| 6,597,632 | B2 | 7/2003 | Khan |
| 6,662,899 | B2 | 12/2003 | Norris et al. |
| 6,672,386 | B2 | 1/2004 | Krueger et al. |
| 6,747,914 | B2 | 6/2004 | Aronstam |
| 6,807,487 | B2 | 10/2004 | Khan |
| 7,096,092 | B1 | 8/2006 | Ramakrishnan et al. |
| 2002/0092701 | A1* | 7/2002 | Norris et al. ............... 181/102 |
| 2002/0120429 | A1 | 8/2002 | Ortoleva |
| 2003/0026166 | A1* | 2/2003 | Aronstam ................... 367/25 |
| 2004/0010374 | A1 | 1/2004 | Raghuraman et al. |
| 2006/0184346 | A1 | 8/2006 | Panga et al. |
| 2006/0224369 | A1* | 10/2006 | Yang et al. ................... 703/10 |

OTHER PUBLICATIONS

Johnson et al., "Pulse-Testing: A new method for describing reservoir flow properties between wells", Petroleum Transactions, AIME, Dec. 1966, pp. 1599-1604, SPE 1517.

Kamal et al., "Pulse-Testing Response for unequal pulse and shut-in periods", Society of Petroleum Engineers Journal, Oct. 1975, SPE 5053 (includes associated papers 14253, 19365, 20792, 21608, 23476 and 23840).

Bryant et al., "Real-Time Monitoring and control of water influx to a horizontal well using advanced completion equipped with permanent sensors", SPE 77522, 2002.

Bryant et al., "Utility and Reliability of Cemented Resistivity arrays in Monitoring Waterflood of the Mansfield Sandstone, Indiana, USA", SPE 71710, 2001.

Kuchuk F. J., "A new method for determination of Reservoir Pressure", SPE 56418, 1999.

Everdingen et al., "The application of the Laplace transformation to flow problems in Reservoirs", Transactions of the American Institute of Mining and Metallurgical Engineers, vol. 186, Dec. 1949, pp. 305-324-B.

Raghuraman et al., "MO19 Interference Analysis of Cemented-Permanent -Sensor Data from a field Experiment", EAGE 63rd Conference & Technical Exhibition, Jun. 11-15, 2001.

Earlougher, Jr., R. C., "Advances in Well Test Analysis", Chapter 2, Principles of Transient Test Analysis, pp. 4-6, American Institute of Mining, Metallurgical, and Petroleum Engineers, Inc. 1977.

Matthews et al., "Pressure Buildup and Flow Tests in Wells", pp. 10-14, American Institute of Mining, Metallurgical, and Petroleum Engineers, Inc. 1967.

Raghavan R., "Well Test Analysis", Chapter 1, Introduction to Well Testing, pp. 1-8, Chapter 4, Flow to a Well in an Infinite Reservoir, pp. 42-52 and pp. 67-68, 1993 by P T R Prentice-Hall, Inc.

Press et al., "Numerical Recipes in FORTRAN", Chapter 12, Fast Fourier Transform, pp. 490-492, Cambridge University Press 1986, 1992.

* cited by examiner

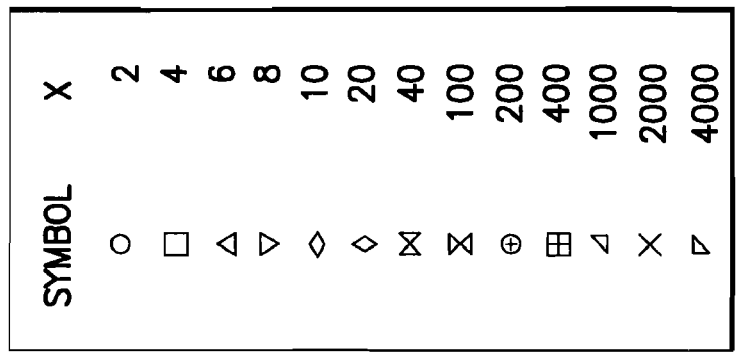
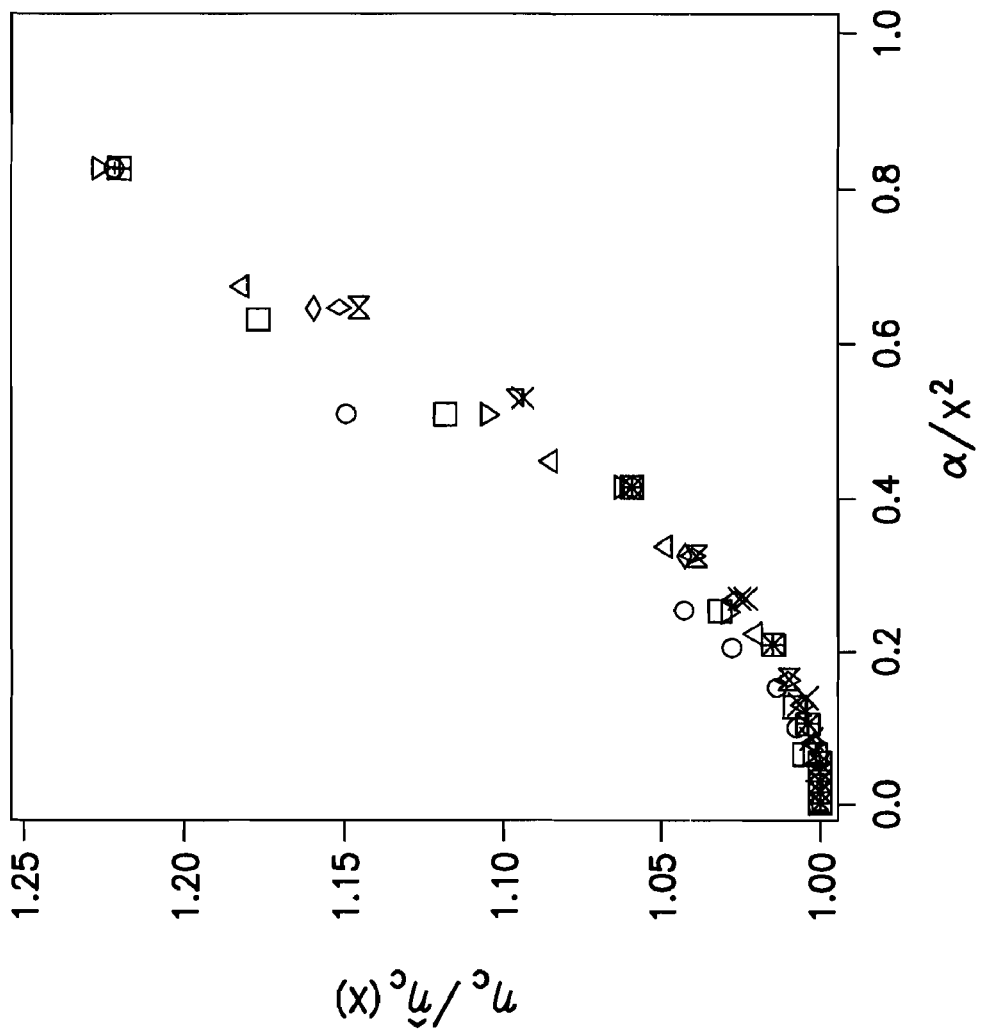
FIG. 1

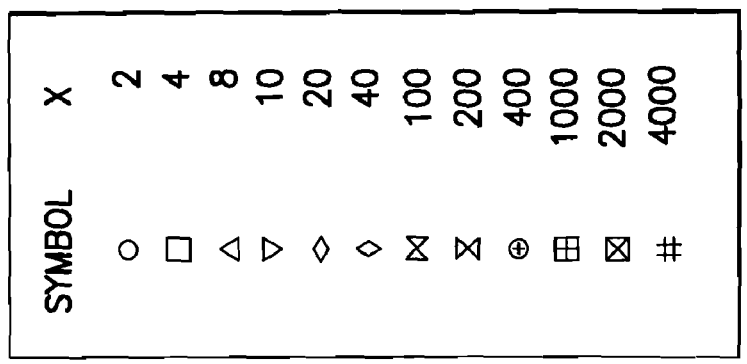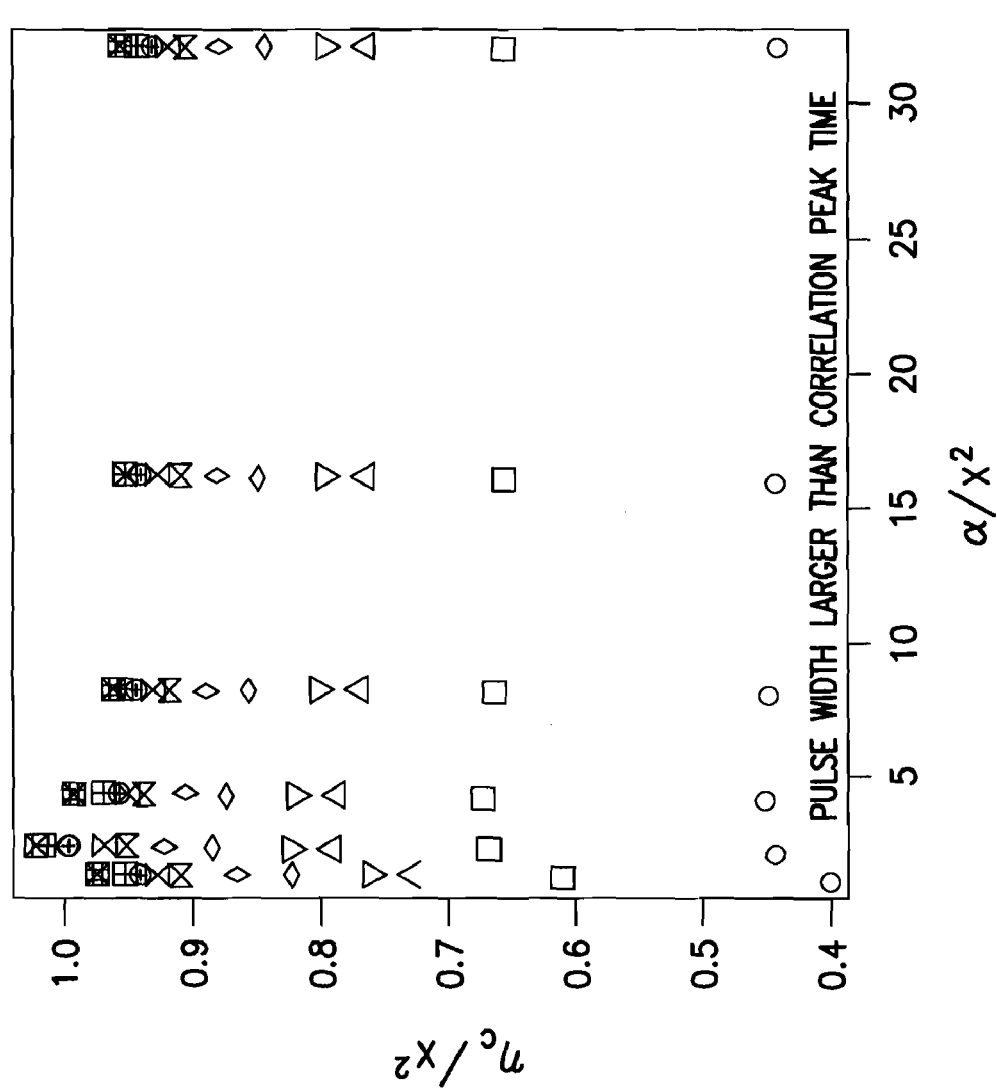
FIG.2

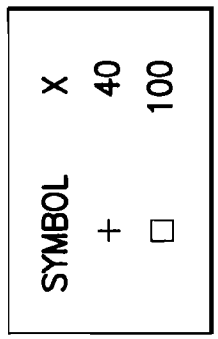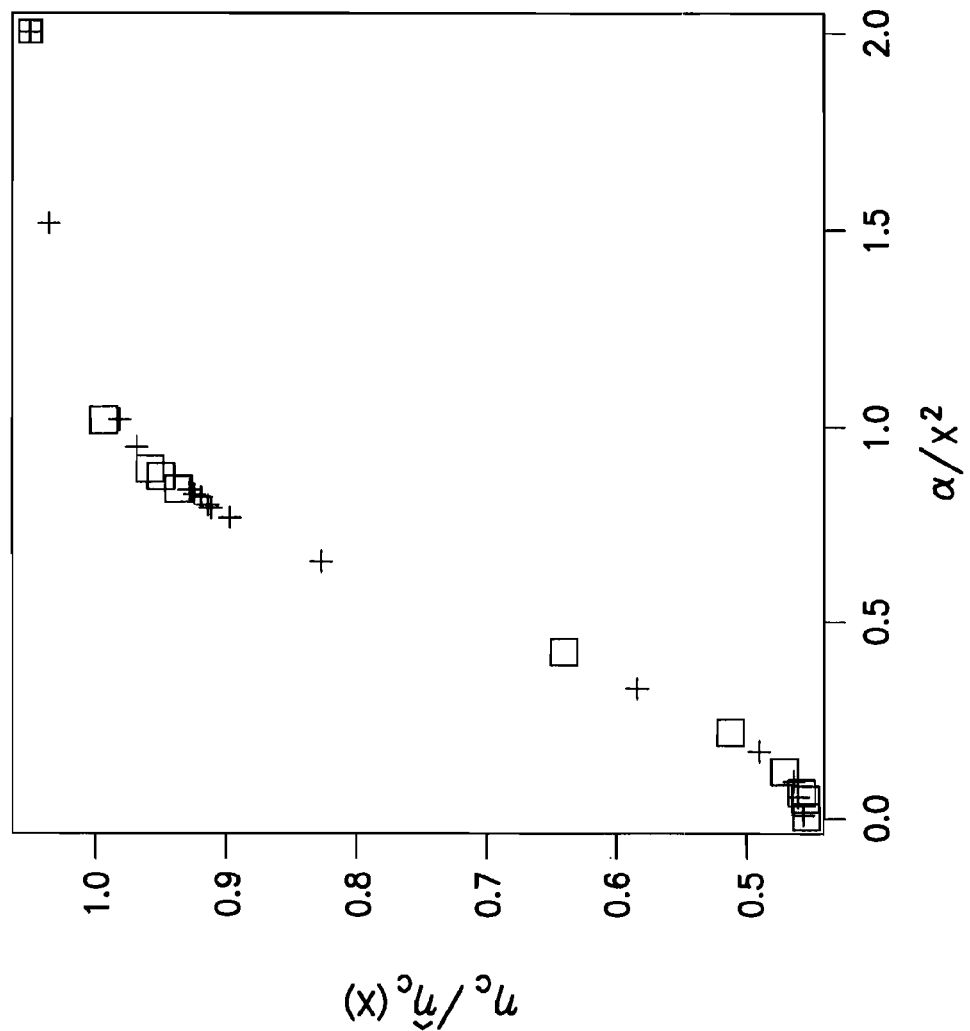
FIG. 4

Step (a)

Obtaining source pressure pulses at one or more location in a source well so as to gather source pressure pulse data

Step (b)

Obtaining observer pressure data at one or more location in an observer well, wherein said observer pressure data may be correlated to said source pressure pulse data

Step (c)

Repeating Steps (a) and (b) one or more times

Step (d)

Developing a correlation between said source pressure pulse data and said observer pressure data as a function of time, wherein said correlation is based on a function governed by pressure diffusion

Step (e)

Determining the time location of the maximum value of said correlation and analyzing the decay of said maximum value over time so as to gather correlation time data governed by pressure diffusion

Step (f)

Using said correlation time data to obtain pressure diffusivity between the at least one source well and the at least one observer well and using the pressure diffusivity to estimate inter-well permeability, so as to monitor at least one characteristic such as permeability from the one or more characteristic of the region of said earth formation so as to gather monitored permeability data

Step (g)

Storing said monitored permeability data

FIG. 17

METHOD FOR CONTINUOUS INTERPRETATION OF MONITORING DATA

RELATED APPLICATIONS

This application is a divisional of application Ser. No. 11/145,424, filed on Jun. 3, 2005 (US Publication Application Number 2005/0270103) now abandoned, which claims priority from U.S. provisional patent application Ser. No. 60/577,269 filed Jun. 4, 2004 (incorporated by reference herein in its entirety).

FIELD OF THE INVENTION

The present invention relates to the cross-correlation of data to monitor formation properties, and more particularly, to the cross-correlation of pressure data to monitor permeability in a reservoir using permanent or semi-permanently installed sensors.

BACKGROUND OF THE INVENTION

Permanent surface and downhole sensor technology is increasingly being implemented to enable real time monitoring and reservoir management. Acquiring vast quantities of data in real time at high frequencies is useful only if data processing and interpretation can be done at same time scales. Otherwise the value of high frequency information is lost. U.S. patent application Ser. No. 09/705,674 to Ramakrishnan et al. (the '674 Application) now an issued U.S. Pat. No. 7,096,092 (incorporated herein by reference in its entirety) teaches methods for real time data acquisition and remote reservoir management using information from permanent sensors. U.S. patent application Ser. No. 10/442,216 (or US Publication Application Number 2004/0010374, pending) to Raghuraman et al. (the '216 Application) (incorporated herein by reference in its entirety) teaches methods to efficiently process and interpret vast quantities of data acquired from permanent sensors. The '216 Application outlines algorithms for processing data at relevant time scales. The subsequent interpretation is then done using increasingly detailed levels of modeling so that the levels of modeling match the time scale of data processing. For example a pressure-pressure derivative correlation across two locations in a reservoir may be done to estimate the pressure diffusion time between these two locations and used as a tracker for formation properties (permeability, fluid mobility, porosity) over time (see the '674 Application, and Raghuraman, et al., "Interference Analysis of Cemented-Permanent-Sensor Data from a Field Experiment," (M019), Jun. 11-15, 2001, EAGE 63rd Conference & Technical Exhibition, Amsterdam, incorporated herein by reference in its entirety). This is a quick look interpretation that can easily be done over a time scale of hours/days as opposed to a full-scale reservoir simulation that takes a time scale of weeks/months. Such quick look interpretation methods, which match time scales of data collection, are needed if one has to maximize the value of high frequency information from permanent sensors. They can be useful for tracking changes in formation properties over time as well as for constraining more detailed reservoir models.

In principle, well-testing constitutes an inverse problem. One starts with assumptions regarding the reservoir, and based on the transient response attempts to estimate the relevant properties. System identification techniques through deconvolution, type-curve matching for the reservoir model, and variants of Newton iterative techniques are common in well-test interpretation. Conventional well testing implies a production or an injection test, and monitoring the resulting pressure behavior at the wellbore. (See Earlugher, "Advances in Well Test Analysis," Soc. Pet. Eng. AIME, New York (1977); Matthews et al., "Pressure Buildup and Flow Tests in Wells," Soc. Pet. Eng. AIME, New York (1967); and Raghavan, *Well Test Analysis*, Prentice Hall (1993), incorporated by reference herein in their entireties). Adequate shut-in prior to a well test, or alternatively, inclusion of rate data, is important in order to eliminate the influence of historical production in the interpretation. Significant emphasis is placed on the determination of skin-factor in such tests. In contrast, in interference testing, pressure is measured in a shut-in well, termed the observation well. Other wells continue to be active. Such tests can be useful in estimating reservoir scale permeabilities between the observer and the other wells, if one chooses to deploy a suitable testing scheme. The physics of the method is substantively the same as conventional testing schemes; but the methodology and the procedures are different.

An enhancement to interference testing is the pulsed interference testing, wherein a periodic pulsing of a well is carried out, and the response at an observation well is analyzed. (See Brigham, "Planning and Analysis of Pulse-Tests," J. Pet. Technol. (1970), volume 22, pages 618-624; Johnson et al., "Pulse-testing: A new method for describing reservoir flow properties between wells," J. Pet. Technol. (1966), volume 18, pages 1599-1604; Kamal et al., "Pulse-testing response for unequal pulse and shut-in periods," J. Pet. Technol. (1975) volume 27, pages 399-410, incorporated by reference herein in their entireties). An extensive set of "type-curves" is available to translate the magnitude and the time-lag of the pulse responses at the observation well. The lag is the time between the beginning of the source pulse and the peak in the pressure response. While such a method was an advance over conventional techniques for estimating inter-well permeability, a certain degree of regularity and ideality for the pulses is required. Calculations are based on extensive table/type-curve look-up, and the applicability of these techniques assume ideal conditions (e.g. periodicity, uniformity etc.). A translation of these methods for continuous updating of inter-well permeability with nonsystematic or irregular pulsing is difficult.

Accordingly, the present invention provides a quick look interpretation methodology for cross-correlation of sensor data. Such techniques may be applied to cross-correlation of data from different sensor types at same or different locations.

SUMMARY OF THE INVENTION

It is shown that a pressure pulse originating in a well is correlated to a pulse observed at a distant well with a characteristic time. The correlation time is directly related to the diffusion time scale arising out of the pressure diffusion equation. The relationship is affected by the source-observer or observer-observer distance but the correction is small for large distances. In practice, further corrections have to be included for finite width pulses. For these pulses, a practical scheme for continuous permeability monitoring is presented.

Wellbore storage also has a strong influence on the correlation time-scales. A simple forward calculation that removes this effect and allows a direct estimation of reservoir scale permeability is also provided. The techniques described herein are simpler to practice than conventional interference testing and do not require the same level of periodicity or uniformity of pulses.

In addition, a technique is described that is based on parameter estimation through forward calculations. No nonlinear parameter estimation is needed. The method relies on the correlation of signals at the source and the observer. The advantage of the method is that it can be performed on a dynamic basis over a window of data to give a continuous estimate of permeability in the region between wells. It is insensitive to nonperiodicity and the strength of the pulses, which makes the approach practical. The method is robust when multiple wells operate simultaneously in the region of the observer. Preferably, the pulsing is carried out in a separable manner.

According to an embodiment of the invention, the invention includes a method for monitoring one or more characteristic of a region of a earth formation over time so as to provide reservoir characterization for reservoir management. The method comprises the step of (a) obtaining source pressure pulses at one or more location in a source well so as to gather source pressure pulse data; (b) obtaining observer pressure data at one or more location in an observer well, wherein said observer pressure data may be correlated to said source pressure pulse data; (c) repeating (a) and (b) one or more times; (d) developing a correlation between said source pressure pulse data and said observer pressure data as a function of time, wherein said correlation is based on a function governed by pressure diffusion; (e) determining the time location of the maximum value of said maximum correlation and analyzing the decay of said maximum value over time so as to gather correlation time data; (f) using said correlation time data to obtain pressure diffusivity between the at least one source well and the at least one observer well and using the pressure diffusivity to estimate inter-well permeability, so as to monitor at least one characteristic such as permeability from the one or more characteristic of the region of said earth formation so as to gather monitored permeability data; and finally the step of (g) storing said monitored permeability data.

According to another embodiment of the invention, the invention can include a method of monitoring permeability of a region of earth formation over time so as to assist with reservoir management. The method comprises the steps of: (a) inducing one or more pressure pulses at one or more location in at least one source well, wherein data on said induced pressure pulses is gathered and referred as induced pressure pulse data; (b) measuring pressure data at one or more location in at least one observer well, wherein said pressure data includes pressure pulses having diffused through at least a portion of said earth formation whereby diffused pressure pulse data is gathered; (c) repeating (a) and (b) one or more times; (d) developing a correlation between said induced pressure pulse data and said diffused pressure pulse data as a function of time so as to gather correlation time data; and finally the step of (e) analyzing said correlation time data to obtain pressure diffusivity between the at least one source well and the at least one observer well and using the pressure diffusivity to estimate interwell permeability, so as to monitor the permeability of the region of earth formation and gather monitored permeability data.

According to an aspect of the invention, the method may include the induced pressure pulse data being differentiated pressure data and the diffused pressure pulse data being differentiated pulse pressure data. Further, the method can include the differentiated pressure data being a time derivative of pressure data at the at least one source well and the differentiated pulse pressure data being a time derivative of pressure data of the at least one observer well.

The correlations described above can be based on a propagation function. In some instances, it may be preferable to analyze the shape of the correlation over time. Furthermore, the analysis may include determining the time location of the maximum value of the correlation and analyzing the decay of the maximum value over time. In some instances, the source data can be pressure pulses and the observer data will be pressure data. In this example, the correlation will governed by diffusion, and at least one of the earth formation characteristics will be permeability. It is noted that other sensor data may be used and appropriate corresponding correlations developed.

In some instances, it may be preferable to use differentiated pressure pulses from the source and differentiated pressure data from the observer. Alternatively, source data may be flow data and observer data may be pressure data.

Furthermore, (a), (b) and (c) of the above embodiments may be repeated for more than one observer well or for more than one source well.

Also provided are methods for correcting the propagation function for errors due to storage effects at the source well, for errors due to the distance between the source and the observer, and for the width of the pressure pulse.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE FIGURES

FIG. 1 is a graph showing pressure-pressure correlation-peak dimensionless time, suitably normalized, with respect to normalized dimensionless pulse width time; this is applicable for short pulse widths ($\alpha < \eta_c$).

FIG. 2 is a graph showing dimensionless correlation time for differentiated pressures, as a function of dimensionless pulse width time, both normalized to $X^2$; this is applicable for large pulse widths ($\alpha > \eta_c$).

FIG. 4 is a graph showing short ($\alpha < \eta_c$) and large ($\alpha > \eta_c$) pulse width results for dimensionless correlation time for differentiated pressures, as a function of dimensionless pulse width time, normalized to $\hat{\eta}_c$ (X) and $X^2$ respectively.

FIG. 17 is a flow chart of at least one embodiment of the subject matter disclosed in this application.

DETAILED DESCRIPTION OF THE INVENTION

Figure 3:
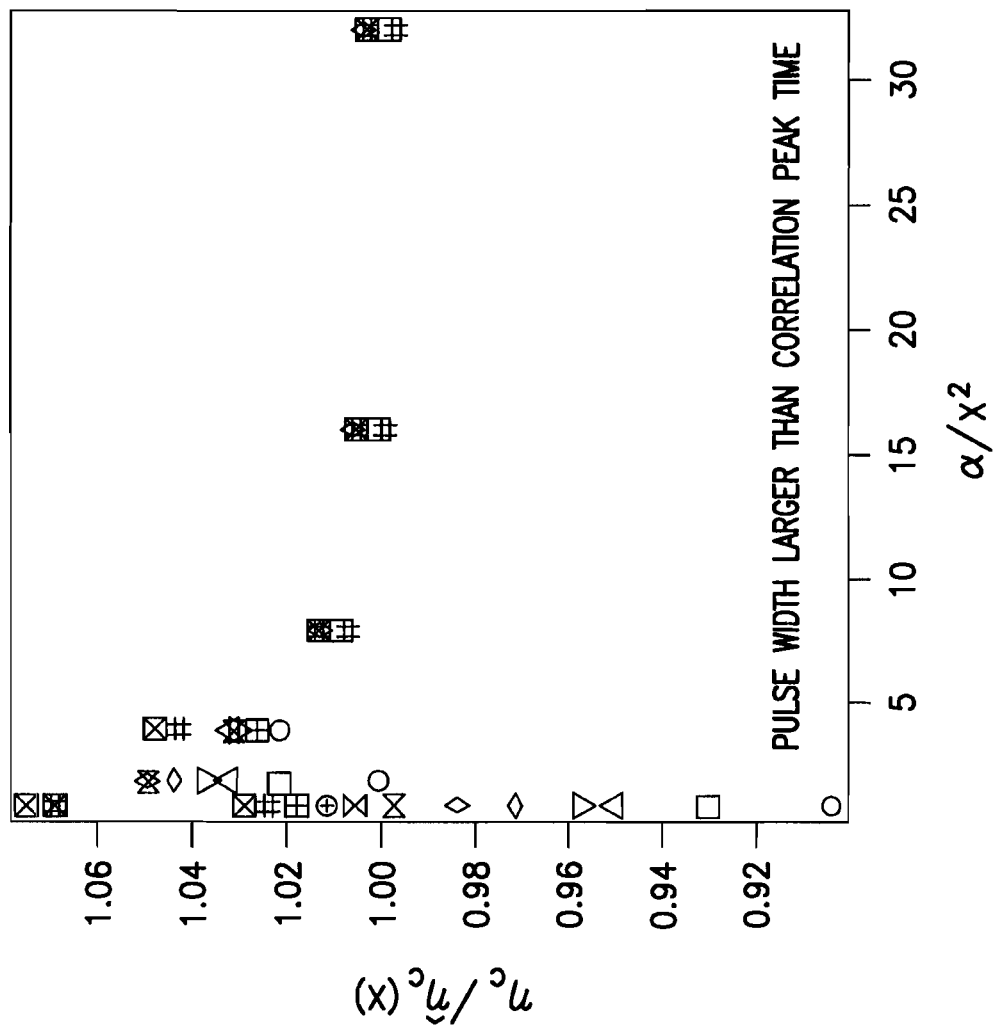
FIG. 3 is a graph showing dimensionless correlation time for differentiated pressures, as a function of dimensionless pulse width time, normalized to $\hat{\eta}_c$ and $X^2$, respectively; this is applicable for large pulse widths ($\alpha > \eta_c$).

Efficient data processing and interpretation of vast quantities of data from permanent sensors is necessary to realize the full value of permanent monitoring. The '674 Application teaches a method of real-time interpretation using correlation time from cross-correlation of sensor data. This concept proposes more robust methods of cross-correlation of permanent sensor data streams in real time. In addition to tracking correlation time in such cross-correlations, it is proposed to also monitor the shape of the correlation function. This shape is essentially characteristic of the nature of the sensor response to a disturbance and gives more information about the formation in real time. The shape of the response together with correlation time also offers better constraints for forward models. In some cases where it is difficult to estimate correlation time, the shape parameters may offer a more robust approach.

A source well in an infinite nondeformable formation is assumed. Pressure for a slightly compressible fluid satisfies the diffusion operator. Therefore, $$\frac{\partial p}{\partial t} = \nabla \cdot D \nabla p \tag{1}$$

The diffusion constant $$D \text{ is } \frac{k}{\phi \mu c}$$

where c is the fluid compressibility, $\mu$ is the shear coefficient of viscosity, $\phi$ is the porosity of the porous medium, k is the permeability of the porous medium, p is pressure, and t is time. The properties of the porous medium are assumed to be representative homogenized constants.

As is known in the art, it can be assumed that the source of the flux is a line. Here pressure is computed at the wellbore radius of the source $r_w$ (see Raghavan (1993)). If one assumes a fully-penetrating line-source in an infinite, cylindrical medium, the governing equation for pressure in terms of t and the radial distance r from the source reduces to $$\frac{\partial p}{\partial t} = D \frac{1}{r} \frac{\partial}{\partial r} \left[ r \frac{\partial p}{\partial r} \right] \tag{2}$$

At a distance $r_o$ from this source well, there is an observation line, the pressure of which is labeled as $p_o$. Below, the case of an ideal pulse at the source and the resulting correlation with the pressure at the observer is considered.

Ideal pulse. Given a flow pulse of magnitude Q at time t=0, the boundary condition at the source is $$\lim_{r \to 0} -2\pi r h \frac{k}{\mu} \frac{\partial p}{\partial r} = Q \delta(t), \tag{3}$$

where h is the formation layer thickness and $\delta$ has the usual meaning of a Dirac delta functional. A positive flow rate is used to denote injection.

With the restriction that the pressure must decay to its initial value of zero when r approaches infinity, the solution at the source, $p_s$, is $$p_s(t) = \frac{Q\mu}{4\pi k h} \frac{1}{t} \exp\left[-\frac{r_w^2}{4Dt}\right] H(t) \tag{4}$$

where H(t) is the Heaviside function, D is the pressure diffusivity, the subscript s represents the source, and the subscript w represents the wellbore. At the observation point, the pressure is $$p_o(t) = \frac{Q\mu}{4\pi k h} \frac{1}{t} \exp\left[-\frac{r_o^2}{4Dt}\right] H(t) \tag{5}$$

where $r_o$ is the radius of the observer and $p_o$ is the pressure of the observer (the subscript o represents the observer). A correlation function between the source and the observer is constructed. For the ideal case of an impulse source, the correlation may be carried out between the two pressures. [It is noted that while pressure measurements are used (with a diffusivity propagation function), other sensors may be used with different propagating functions. For example, acoustic measurements may be used with an acoustic wave equation.] The correlation function C of $p_s$ and $p_o$ (which depends on t) is defined to be (see Press et al., *Numerical Recipes in FORTRAN*, Cambridge University Press (1992), incorporated by reference in their entireties).

$$C(p_s, p_o)(t) = \int_{-\infty}^{\infty} p_o(t + \tau) p_s(\tau) d\tau \tag{6}$$

where $\tau$ is a dummy variable. The peak in the correlation function with respect to t gives the characteristic time scale $t_c$ (where the subscript c represents the characteristic or correlation) which in turn is related to interwell permeability. For the purpose of identifying parameters, it is useful to define dimensionless groups. First, the characteristic diffusion time scale T is based on the length scale $r_w$ so that $T=\phi\mu c r_w^2/k$, where, T is the diffusion (representative time), and c is the compressibility of the fluid. The characteristic pressure scale is given by $Q\mu/(2\pi kh)$. Differentiating the function C with respect to t, defining $4D\tau/r_w^2=4\tau/T$ as $\xi$, and $4Dt_c/r_w^2=4t_c/T$ as $\eta_c$, the value of $\eta$ ($=4Dt/r_w^2$), for which the correlation function becomes a maximum, is obtained by satisfying:

$$\int_0^\infty \frac{1}{\xi(\eta_c + \xi)} \exp\left[-\frac{X^2}{(\eta_c + \xi)}\right] \exp\left[-\frac{1}{\xi}\right] \cdot \left\{\frac{X^2}{(\eta_c + \xi)^2} - \frac{1}{\eta_c + \xi}\right\} d\xi = 0 \tag{7}$$

where X is the dimensionless ratio of distances $r_o$ to $r_w$ (that is, the ratio of the observer to source radii) and $\xi$ is a dimensionless dummy value. Eq. 7 enables the calculation of $\eta_c$. Here, $\hat{\eta}_c(X)$ is the function that gives $\eta_c$ when the source is an impulse; accordingly, $\eta_c$ depends only on X. In practice, rather than solving for $\eta_c$ with this integral equation, a maximum of the function $$\gamma(\eta; X) = \int_0^\infty \frac{1}{(\eta+\xi)} \frac{1}{\xi} \exp\left[-\frac{X^2}{\eta+\xi}\right] \exp\left[-\frac{1}{\xi}\right] d\xi \quad (8)$$

is determined with respect to $\eta$, for a given X. This is equivalent to maximizing the correlation function of Eq. 6 with respect to t.

The results for $\eta_c$ for various values of X are provided in Table 1 below.

TABLE 1

Correction Factors, $\frac{1}{X^2}\hat{\eta}_c(X)$

| X | $\eta_c/X^2$ |
|---|---|
| 2 | 0.4423 |
| 4 | 0.6563 |
| 6 | 0.7310 |
| 8 | 0.7702 |
| 10 | 0.7948 |
| 20 | 0.8489 |
| 40 | 0.8820 |
| 100 | 0.9092 |
| 200 | 0.9229 |
| 400 | 0.9328 |
| 1000 | 0.9427 |
| 2000 | 0.9485 |
| 4000 | 0.9531 |

Ideally (and as described in the '674 Application), it is expected that $\eta$ should equal $X^2$, i.e., $t_c = r_o^2/(4D)$. For small X, $\hat{\eta}_c$ deviates from $X^2$ and is less than unity; but for practical values of X, $\hat{\eta}_c/X^2$ approaches unity. Under any case, the correction factor is known a priori. The result for $\eta_c$ is the basis for interpretation via forward calculation. An impulse flow is induced at a source well, observe the pressure at both the source and a monitoring well. With a suitable time window, the correlation function is computed, preferably by FFT, and the result scanned. The location of the function maximum gives $t_c$, obtaining $$D = \frac{1}{4} \frac{\eta_c r_w^2}{t_c} = \frac{1}{4} \frac{\hat{\eta}_c(X) r_w^2}{t_c}. \quad (9)$$

Thus, using a noniterative method, an estimate for the diffusion constant may be made in real-time with occasional pulsing. This is translated to permeability using $$k = \phi\mu cD, \quad (10)$$

assuming that $\phi\mu c$ is known. If the pulse is sufficiently ideal (although it may be of finite width), one may look at the magnitude of the correlation function to estimate other properties.

Since $\eta_c$ grows as $X^2$, it is convenient to consider an O(1) quantity, $u_{\eta_c}$, a normalized quantity:

$$u_{\eta_c} = \eta_c/X^2. \quad (11)$$

While the idea of an impulse flow rate is useful for understanding the concept behind continuous interpretation, practical constraints allow the implementation of only a finite amplitude pulse for a nonzero time duration. Again, an ideal finite pulse is considered, i.e., the reservoir is quiescent, except for this pulse of a rectangular shape.

Finite width pulsing. For a pulse of magnitude Q, but with a pulse width in time equal to pulse width (v), the flow rate at the source fixes the wellbore boundary condition may be written as $$-2\pi rh \frac{k}{\mu} \frac{\partial p}{\partial r} = \frac{Q}{v}[H(t) - H(t-v)] \quad (12)$$

where H(t) is the Heaviside function. Accordingly, the pressure responses at the source well is $$p_s(t) = \frac{Q\mu}{4\pi kh} \frac{1}{v} \left\{ E_1\left(\frac{r_w^2}{4Dt}\right) H(t) - E_1\left(\frac{r_w^2}{4D(t-v)}\right) H(t-v) \right\} \quad (13)$$

where $E_1$ is the exponential integral. The corresponding observer pressure is $$p_o(t) = \frac{Q\mu}{4\pi kh} \frac{1}{v} \left\{ E_1\left(\frac{r_o^2}{4Dt}\right) H(t) - E_1\left(\frac{r_o^2}{4D(t-v)}\right) H(t-v) \right\} \quad (14)$$

For the finite pulse, a correlation function $C(p_s, p_o)(t)$ as in Eq. 6 is constructed. Unlike the pulse problem, the functional form here is different depending upon the location of the maximum of C. If the wells are sufficiently far apart the correlation function maximum occurs at a time larger than v. For t>v, the following correlation may be derived $$C(p_s, p_o)(t) = \left(\frac{Q\mu}{4\pi kh}\right)^2 \frac{1}{\alpha v} \quad (15)$$

$$\int_0^\infty E_1\left(\frac{1}{\xi}\right)\left[2E_1\left(\frac{X^2}{\eta+\xi}\right) - E_1\left(\frac{X^2}{\eta+\xi+\alpha}\right) - E_1\left(\frac{X^2}{\eta+\xi+\alpha}\right)\right] d\xi$$

where $\alpha$, a dimensionless pulse width, is equal to $4D v/r_w^2$. Note that $\eta$ is a scaled form of t, and since t>v, $\eta>\alpha$. Clearly, as $\alpha \to 0$, the results should approach those of the impulse correlation provided above.

When the wells are closely spaced, the characteristic correlation time becomes shorter than any practical pulse width time. Then, as per the above procedure, a different result given by $$C(p_s, p_o)(t) = \left(\frac{Q\mu}{4\pi kh}\right)^2 \frac{1}{\alpha v} \int_0^\infty E_1\left(\frac{1}{\xi}\right) \cdot \quad (16)$$

$$\left\{ 2E_1\left(\frac{X^2}{\eta+\xi}\right) - E_1\left(\frac{X^2}{\eta+\xi+\alpha}\right) - E_1\left(\frac{X^2}{\xi}\right)\left(\frac{1}{\alpha+\xi-\eta}\right) \right\} d\xi$$

is obtained. This is applicable for t<v or $\eta<\alpha$.

Numerical evaluation of the analysis. The location ($\eta_c$ or equivalently $t_c$) of the peak of the correlation function has been computed for the above results. Unlike the pulse correlation, where $\eta_c$ depends only on X, here $\eta_c$ for which C is a maximum will depend on both $\alpha$ and X. Furthermore, computations of the quadrature with the exponential integrals in the integrand is limited by the numerical accuracy that may be achieved, especially for small values of $\alpha$. Therefore, for $\alpha \to 0$, the values generated by the correlations obtained with the impulse responses are used.

An interesting feature of the computed results for $\eta_c$ is that a normalized plot virtually collapses the dependency of $\eta_c$ on two parameters $\alpha$ and X to a single curve. In FIG. 1, the y-axis is the ratio of $\eta_c$ to $\hat{\eta}_c(X)$, i.e., the ratio of $\eta_c$ when a finite pulse is used to that of an impulse result. The ratio $\alpha/X^2$ is on the x-axis. Thus, as the x-axis goes to zero the disturbance is akin to an impulse and the ordinate should approach unity. Regardless of the value of X, all of the curves seem to lie within a narrow band, leading to an almost universal correction for the correlation-peak time. Knowing the width of the pulse, and the distance to the source, a simple algorithm for calculating the diffusivity of the formation, and hence the permeability, can be constructed.

The algorithm for the calculation is simple. Knowing the width of the pulse, start with a value for D from Eq. 9 assuming $\eta_c = \hat{\eta}_c(X)$ and compute $\alpha$ and $\alpha/X^2$. From FIG. 1, or equivalently from an algebraic form of the figure, $\eta_c$ can be evaluated. From the known value of $t_c$ obtained by correlating the appropriate data windows, $\eta_c$ is converted to D using $D = \eta_c r_w^2/(4t_c)$. The process is continued until D is satisfactorily converged.

The numerical results above have been obtained by considering the case of $\alpha < \eta_c$, i.e., the correlation-peak time is larger than the width of the pulse. For the second case of the large pulse widths, however, the differentiated data is correlated as provided below.

Differentiated data correlation. The pressure at the source and observer is differentiated with respect to time and a correlation function is constructed. For this correlation, the responses due to a finite pulse are used. The idea is that for a finite pulse of a sufficiently large width, the correlation of differentiated results will be the same as the one with impulse responses and the correlation function peak should approach the value of $\hat{\eta}_c(X)$. The applicability of this for pulses of finite width is examined here.

The pressure derivative for the source, $\dot{p}_s(t)$, is $$\frac{dp_s(t)}{dt} = \frac{Q\mu}{4\pi kh} \frac{1}{v} \left[ \frac{H(t)}{t} \exp\left(-\frac{r_w^2}{4Dt}\right) - \frac{H(t-v)}{t-v} \exp\left(-\frac{r_w^2}{4D(t-v)}\right) \right] \quad (17)$$

The pressure derivative for the observer $\dot{p}_o(t)$ is $$\frac{dp_o(t)}{dt} = \frac{Q\mu}{4\pi kh} \frac{1}{v} \left[ \frac{H(t)}{t} \exp\left(-\frac{r_o^2}{4Dt}\right) - \frac{H(t-v)}{t-v} \exp\left(-\frac{r_o^2}{4D(t-v)}\right) \right] \quad (18)$$

The correlation of differentiated pressures is $$C(\dot{p}_s, \dot{p}_o)(t) = \int_{-\infty}^{\infty} \dot{p}_o(t+\tau) \dot{p}_s(\tau) d\tau \quad (19)$$

With $\alpha$, $\xi$, and $\eta$ defined as before, substituting Eq. 17 and 18 in Eq. 19 gives for $\alpha < \eta$ (short pulse)

$$C = \left(\frac{Q\mu}{4\pi kh}\right)^2 \frac{1}{\alpha v} \left[ \int_0^\infty \frac{e^{-\frac{1}{\xi}}}{\xi} \left\{ \frac{2\exp\left(-\frac{X^2}{\eta+\xi}\right)}{\eta+\xi} - \frac{\exp\left(-\frac{X^2}{\eta+\xi+\alpha}\right)}{\eta+\xi+\alpha} - \frac{\exp\left(-\frac{X^2}{\eta+\xi-\alpha}\right)}{\eta+\xi-\alpha} \right\} d\xi \right]. \quad (20)$$

For $\alpha > \eta$, with differentiated pressures, the responses are close to a pure impulse response. Therefore, when $\eta_c$ is expected to be smaller than $\alpha$ (approximately $X^2$ small compared to $\alpha$), the differentiated pressure correlation may be considered. Small $\alpha$ values are less feasible for reasonable source-observer distance, and therefore $\alpha > \eta$ will be needed for practical applications. The expression for the correlation function with $\alpha > \eta$ is $$C(\dot{p}_s, \dot{p}_o)(t) = \quad (21)$$
$$\left(\frac{Q\mu}{4\pi kh}\right)^2 \frac{1}{\alpha v} \left[ \int_0^\infty d\xi \frac{e^{-\frac{1}{\xi}}}{\xi} \left\{ \frac{2\exp\left(-\frac{X^2}{\eta+\xi}\right)}{\eta+\xi} - \frac{\exp\left(-\frac{X^2}{\eta+\xi+\alpha}\right)}{\eta+\xi+\alpha} \right\} - \frac{\exp\left(-\frac{X^2}{\xi} - \frac{1}{\alpha+\xi-\eta}\right)}{\alpha+\xi-\eta} d\xi \right]$$

Here for $\alpha \to \infty$, $\eta_c = \hat{\eta}_c(X)$.

To obtain $\eta_c$, as before, a maximum in C with Eq. 20 or Eq. 21 is determined. One has to exercise caution that the peak value satisfies the restriction of $\alpha > \eta_c$ or $\eta_c > \alpha$, whatever the case may be. For the above correlation integrals, the numerical results for the case of $\alpha > \eta_c$ are shown in FIG. 2. In this figure, $\alpha/X^2$ is shown on the abscissa; the ordinate is $\eta_c/X^2$, which may be expected to approach $\hat{\eta}_c(X)/X^2$, for large values of $\alpha$. This indeed it does, except for the inevitable numerical errors. This point is further amplified in FIG. 3 where all of the $\eta_c$ curves collapse into essentially one curve when the ordinate is normalized to $\hat{\eta}_c(X)$. The collapse is almost perfect for X>20, down to values of $\alpha/X^2 = 1$ even with an exaggerated ordinate.

In general, for large values of $\alpha$, the ratio $\eta_c/\hat{\eta}_c(X)$ is close to unity for the entire range of $\alpha$. This allows a fast computation of the formation diffusivity. For practical purposes, it probably suffices to use $\eta_c = \hat{\eta}_c(X)$. Also, $\eta_c$ is seen to be nonmonotonic, reaching a peak at about an abscissa value of 2. If one wishes to be more accurate, but nevertheless use a relatively fast computation algorithm, the universal curve result of FIG. 3 may be used. Diffusivity may be first computed using $\eta_c = \hat{\eta}_c(X)$, and then $\alpha/X^2$ calculated. This will allow for a correction to $\eta_c$ and, given the weak dependence of $\eta_c[\hat{\eta}_c(X)]$ on $\alpha/X^2$, a quick convergence is expected.

The differentiated correlation case provides useful results for $\alpha > \eta_c$. Contrarily, for $\alpha < \eta_c$, $C(\dot{p}_s, \dot{p}_o)(t)$, is not particularly attractive to apply. To illustrate this, the numerical results corresponding to X=40 and X=100 are shown in FIG. 4; large pulse result starts approximately at $\alpha/X^2 = 0.819$ for X=40 and 0.874 for X=100. One can see a fairly large dependency on $\alpha$ when $\alpha < \eta_c$, but there is a fairly smooth overlap between large ($\alpha > \eta_c$) and small ($\alpha < \eta_c$) a results. The correlation peak when normalized as $\eta_c/\hat{\eta}_c(X)$ overlap well for different values of X, when plotted against $\alpha/X^2$, a conclusion similar to that discussed above. As $\alpha$ becomes large, but still constrained by $\alpha<\eta_c$, $\eta_c$ approaches the case for $\alpha>\eta_c$. But as $\alpha$ becomes small, there is rapid decrease in $\eta_c$ to roughly half the magnitude. Although for this case $C(p_s,p_o)$ is preferred, $C(\dot{p}_s,\dot{p}_o)$ may also be used.

To summarize, for large pulse widths, it is preferable to correlate the differentiated pressure signals and compute the characteristic correlation time. It is preferred that this time be smaller than the pulse width time for the correlation result to be applicable. Further, when the characteristic pulse width is small, a direct pressure correlation is preferable.

Flow-pressure correlation. The underlying concept for the correlation is readily illustrated with a flow-pressure correlation where analytical results are easier to derive. Consider an impulse in flow rate of magnitude Q at the source. As before, the observer pressure is given by Eq. 5. The correlation of the impulse flow rate and the pressure is $$C(q, p_o)(t) = \frac{Q^2\mu}{4\pi kh}\int_0^\infty \frac{\delta(\tau)}{t+\tau}\exp\left[-\frac{r_o^2}{4D(t+\tau)}\right]H(t+\tau)d\tau \quad (22)$$

C becomes a maximum for $t=t_c$, where $$t_c = \frac{r_o^2}{4D} \quad (23)$$

While this result suggests that it alone is sufficient to estimate the diffusivity of the formation, practical considerations may make pressure based correlations preferable. Noise in flow rate measurements may be large, and if the pulse width is also large, one is forced to deal with differentiated flow/pressure correlations. Differentiation of noisy data is difficult. Where flow rate measurements are available and are of good quality, both forms of correlations may be considered as an added consistency check.

Numerical Illustrations. Thus far, the calculations have been with a single source. Numerical simulations have been carried out to verify that the correlation concept works when production occurs from several wells that may interfere with the deliberate pulsing. In particular, the influence of production noise in the correlation function is addressed. The numerics compute pressures in arbitrarily distributed observation/sink lines fully penetrating an infinite reservoir. If the response function (G) for pressure in well i due to a unit flow rate in well j is $G_{ij}$, then for all practical purposes the result may be superimposed to write $$p_i(t) = \sum_j \int_0^t G_{ij}(t-\tau)dq_j(\tau) \quad (24)$$

The response function $G_{ij}$ is $$G_{ij}(t) = \frac{\mu}{4\pi kh}E_1\left(\frac{\phi\mu r_{ij}^2}{4kt}\right) \quad (25)$$

where $r_{ij}$ is the distance from well i to j. (This solution ignores the requirement of uniform pressure within the distant wells, i.e., all wells are line sources/observers.) Obviously $r_{ij}$ for i≠j is much larger than $r_w$. For i=j, $r_{ij}=r_w$. In the computational algorithm, each source accepts pulses of widths that may be specified and the magnitude of the pulses may also be varied. Random fluctuations in flow rates are allowed in addition to the imposed steps. In experimentation with numerically generated data, it was found that the pressure responses as a result of small random fluctuations show no discernible peaks in the correlation function. Although reinforcement of correlation through random fluctuations in flow rates approach is appealing, if the transient time for diffusion is much larger than the time scale of the small fluctuations, then the time signature of the random fluctuations is essentially lost at the remote points, and it is unlikely that no measurable correlation results.

Unlike conventional pulse testing where a periodic sequence is imposed, the present technique is quite flexible. Furthermore, the interpretation is not weakened by relying on discerning peaks in pressure signals—often corrupted rather strongly by extraneous noise or storage. In addition, production fluctuations in other wells may break the periodicity required in standard pulse-based interference testing. Because the correlation technique analyzes a large window of data, it is not strongly affected by small amounts of unintended flow fluctuations. In fact, these only tend to reinforce the correlation peak, though marginally. Finally, the computation presented herein is rapid, through the use of FFTs.

Preferably, the correlation methods are carried out with respect to pulses in flow rates. Preferably, the pulses are short with respect to overall production schedules, but larger than the characteristic correlation times. With a pulse of sufficiently large width, the correlation is carried out with the differentiated data. These types of numerical illustrations are shown in the '674 Application.

Shape Correlation. To describe the concept in detail, pressure data streams are used as an example. The '674 Application describes a method for pressure-pressure derivative correlation. Pressure transients are created by various means including flow rate pulsing. Correlation of derivatives of these pressure signals gives a time lag between the stimulus at one location and the response at another location. For a radially infinite reservoir with low compressibility fluid and negligible wellbore storage, this time lag or pressure diffusion time is related to the porosity ($\phi$), fluid compressibility (c) and viscosity ($\mu$) and the distance (r) between the two measurement points (as seen above):

$$t_c \approx \frac{\phi\mu cr^2}{4k} \quad (26)$$

If all other properties are known, then the correlation time may be used to estimate the formation permeability. Such correlations can be automated and used in real-time at time scales matching data acquisition frequencies. A trend or change in this time would indicate change in formation property with time.

This was implemented on pressure data streams from an injection experiment (see Raghuraman et al. (2001)) by cross-correlating pressure derivative signals from an injection well and an observation well. The experiment satisfied the assumptions made in derivation of Eq. 26 and was used to infer the presence of a fracture in the interwell region. Further, changes in the correlation time over the one-year course of the experiment were an indicator of change in the fracture characteristic. This parameter was also used to constrain forward models. For more complex reservoir geometries where the equation is not strictly valid, the correlation time cannot be used to directly get an estimate of formation properties but is indicative of some average values. However, this parameter can be tracked to monitor changes in formation properties in that region and also used to constrain more detailed reservoir models (see Bryant et al., "Real-Time Monitoring and Control of Water Influx to a Horizontal Well Using Advanced Completion Equipped With Permanent Sensors," SPE 77525, Sep. 29-Oct. 2, 2002, SPE Annual Technical Conference and Exhibition, San Antonio, incorporated herein by reference in its entirety).

The '674 Application observes that under certain conditions (for example, when the wells are far apart or when the pressure diffusivity is low), the correlation function may be broad and diffused and a peak may not be easily identifiable. Also, in some instances, the reverse may happen when the wells are very close and the formation pressure diffusivity is very high. In such cases, the correlation time may be very small and subject to large errors depending on data acquisition interval, time synchronization errors between different sensors, and numerical processing (differentiation, end point effects etc.) of data. In such instances the correlation time may not be the most robust parameter to track.

As provided here, when cross-correlating sensor (or sensor derivative) data, in addition to tracking correlation times, are gathered, the shape of the correlation function curve is also monitored. The shape of the correlation function curve together with correlation time can be used to track changes in the formation with time as well as to constrain the full-scale reservoir model more robustly. The shape of the correlation function curve also yields information about formation heterogeneity that is not obtainable if correlation time alone were to be used. The details of the concept are further explained using the examples provided below (see Examples 2 and 3 below).

Field Example

A procedure based on time-lag on pressure derivatives for a practical field experiment is applied. Pressure data analysis was a part of an electrical array installation project, which was implemented in Mansfield sandstone reservoir in Indiana, onshore U.S.A. as described by Bryant et al., "Utility and reliability of cemented resistivity sensors to monitoring waterflood of the Mansfield sandstone, Indiana," SPE paper 71710 at the SPE Annual Technical Conference and Exhibition, New Orleans (2001), incorporated herein by reference in its entirety. An experiment in this project included continuous interference testing between an injection well at the center of an inverted five-spot, surrounded by four production wells. A monitoring well was located midway along one of the diagonals, i.e., between the injector and a producer. The distance from the injector to the monitoring well was 71 m. Although the primary purpose of the experiment was to monitor electrode responses in cemented arrays, the monitoring well also had a cemented pressure gauge connected to the formation. The injection pressure was also continuously recorded. This facilitated the pressure derivative correlation, discussed by Raghuraman et al. (2001). Start-up and shut-in pressure signal derivatives were correlated which resulted in values of 28.2 ks and 21.6 ks, yielding a permeability of a few orders of magnitude larger than the expected matrix permeability. A fracture(s) connecting the injection and monitoring well was hypothesized and was independently corroborated by resistivity data. The changing correlation times also indicate the nonlinearity of the fracture with respect to fluid pressures (see Raghuraman et al. (2001)). At the conclusion of the experiment, a lapse of eight months, the correlation time further dropped to 3 ks, indicative of progressive transmissibility enhancement. The correlation method proved to be particularly powerful for identifying such formation property changes.

Example 1

Figure 10A:
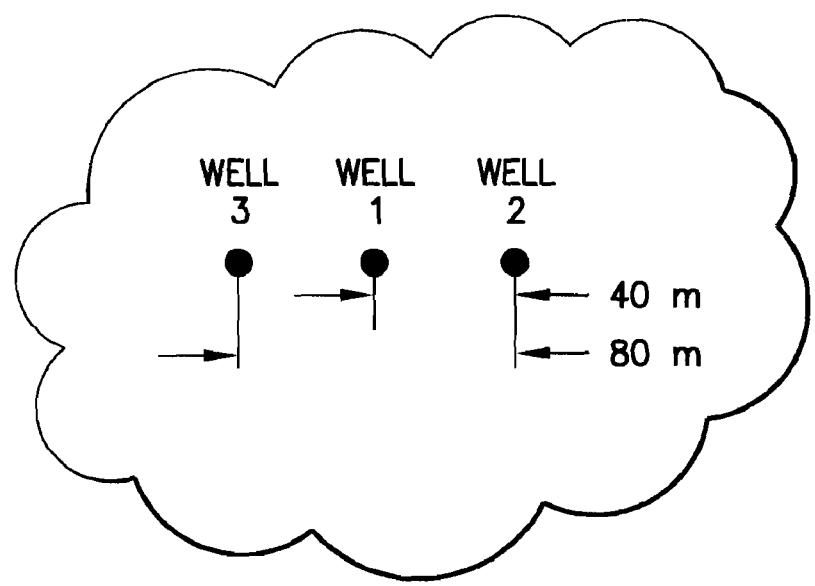
FIGS. 10(*a*) and 10(*b*) are diagrams of the hypothetic reservoirs of Example 1 (FIG. 10(*a*)) and Example 2 (FIG. 10(*b*)).

In this example, there are three wells that are colinearly located as shown in the '671 Patent and in FIG. 10(a). One of them, well 2, is an observation well. Wells 1 and 3 are active wells, 40 m apart, and well 2 is a passive or observation well. Wells 1 and 2 are 40 m apart, whereas well 2 and 3 are 80 m apart. The permeability of the formation is 0.1 μm² (≈100 mD). The porosity is 0.25, the viscosity is 0.001 $kgm^{-1}s^{-1}$, and the compressibility is $4\times10^{-9}$ $m^2N^{-1}$. All the trial calculations included an initial step on which were superimposed finite width pulses. For this example, the interpretation steps are the following.

Pulse active wells 1 and 3 with respect to a background rate.

Ensure that the pulses of each active well are sufficiently separated from those of others and the pulses are wide enough to be larger than the correlation time expected.

Create a window of data, preferably containing 2N (where N is a natural number) points, surrounding the pulse(s) in the wells of interest, with the time synchronized for all of the wells.

Differentiate the pressure data with respect to time.

Correlate the differentiated data between wells 1 and 2. A similar exercise is carried out between wells 3 and 2, when well 3 is pulsed. Avoid correlation of data between the active wells, 1 and 3.

Locate the peak in correlation function. Convert this according to Table 1 above for very large pulse width. When α influences $\eta_c$ (only for small α, an unlikely possibility), the computation is iterative and FIG. 2 results are necessary.

If the pulse width happens to be small compared to the maximum in correlation function, correlate the pressures as opposed to the derivatives, and use FIG. 1.

Figure 5A:
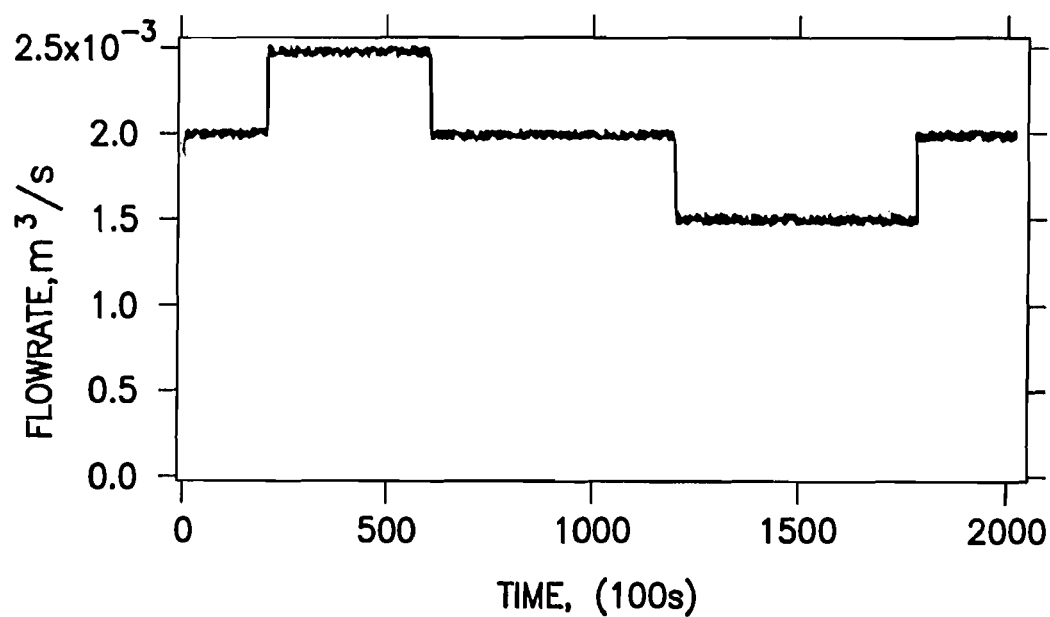
FIGS. 5(*a*) and 5(*b*) are graphs showing flowrates in wells 1 (FIG. 5(*a*)) and 3 (FIG. 5(*b*)).
Figure 5B:
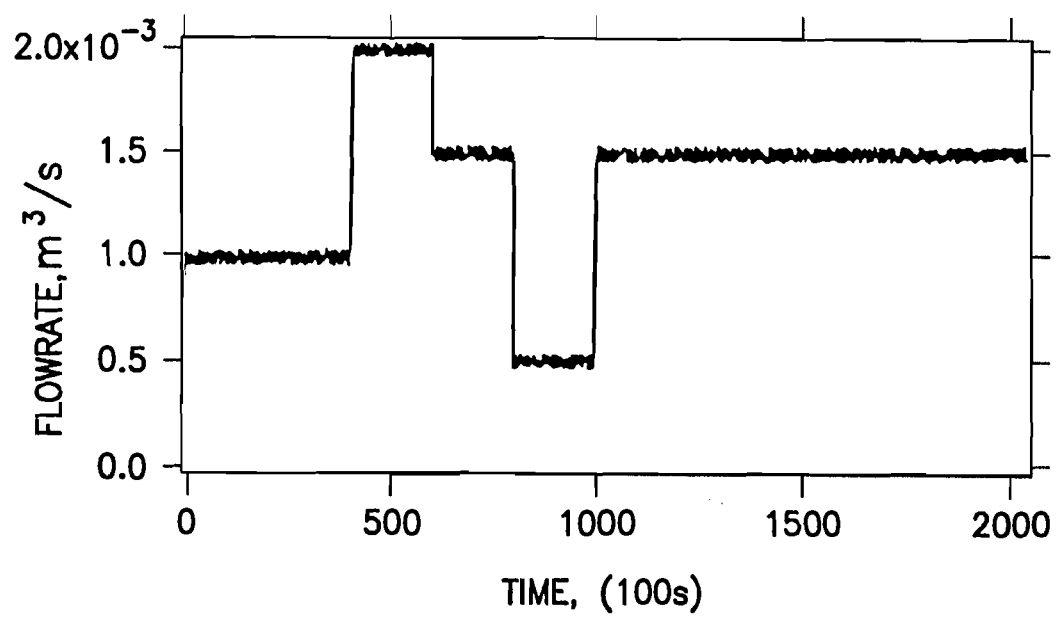
Figure 6:
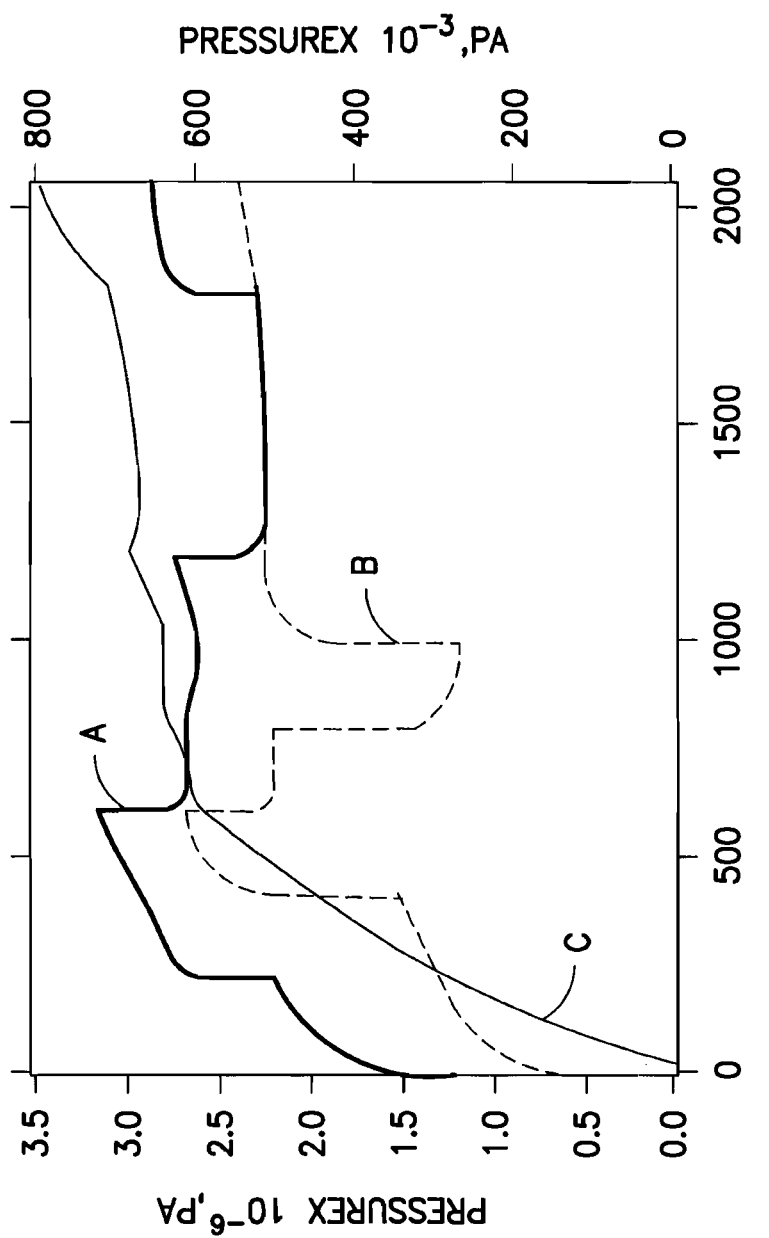
FIG. 6 is a graph showing pressure response corresponding to flowrates of FIGS. 5(*a*) and 5(*b*).
Figure 7:
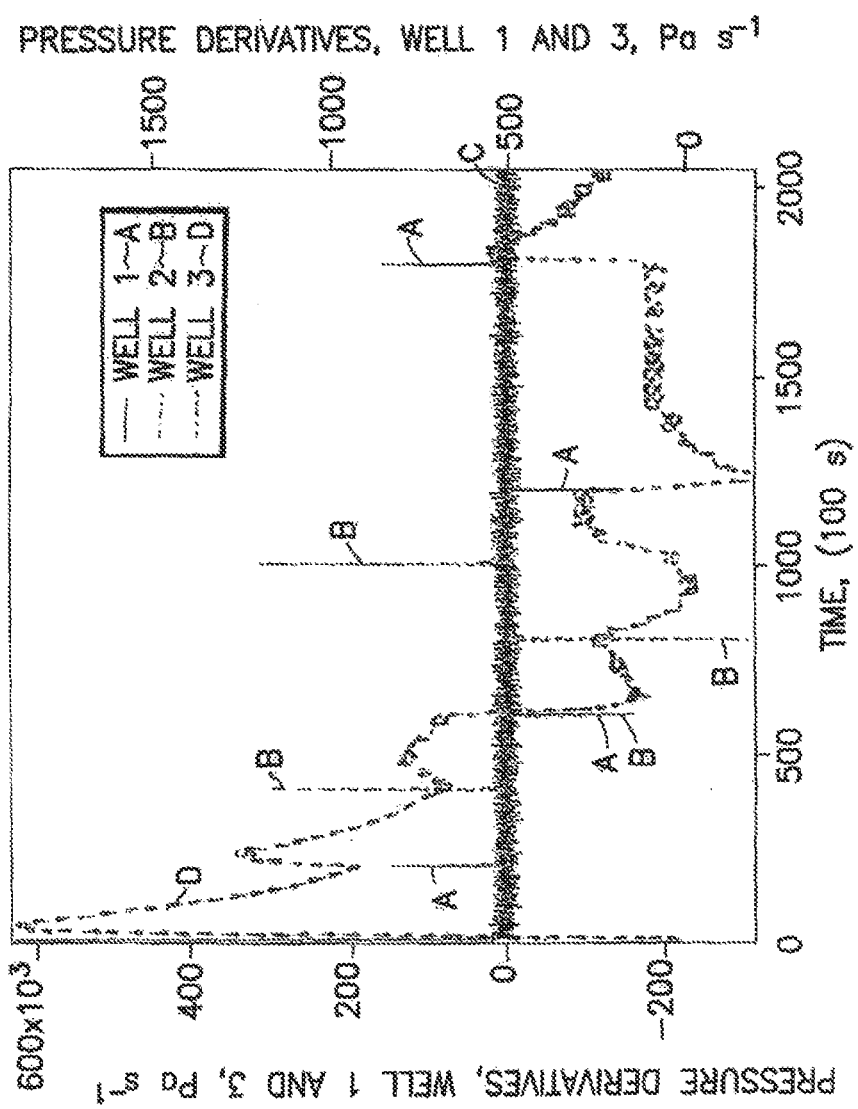
FIG. 7 is a graph showing pressure derivatives in wells 1, 2, and 3.

The calculations shown below are carried out with a 2% noise in rates. The flow rates in wells 1 and 3 are shown in FIGS. 5(a) and 5(b), respectively. There are 2048 discrete data points in this figure, with the time axis in units of 100 s. The corresponding pressure response for all three wells is shown in FIG. 6, where well 1 is shown as line A, well 2 is shown as line C and well 3 is shown as line B. The derivatives of pressures are in FIG. 7.

From the pressure plots, and as expected, the behavior of the observation well is sluggish compared to the active ones. Also, well 3 pulses are a larger step than well 1 because of the distance between the observation point and well 3 (the larger the distance, the less likely the peak in the propagating diffused pressure pulse). The response characteristics of all three wells are more readily seen in FIG. 7. In this figure, well 1 (peaks) are designated by letter A; well 3 (peaks) are designated by letter B. (It is noted that one peak represents overlapping data from both wells 1 and 3.) Horizontal line C represents overlapping data from both wells 1 and 3. Data from well 2 is represented by line D. While the responses in the observation well to a disturbance is clearly seen, the nature of the response is more sluggish when the disturbance is made in the more distant well. The smearing of the response, the characteristic width of which is also related to the diffusion time may ultimately be comparable to the noise, at which point the correlation technique fails to be robust, unless repeated pulses are made to overcome the random noise. Also, the so-called lag time is not clearly discernible with respect to well 3. Therefore, methods based on lag time detection may be unsatisfactory. But the correlation technique is reliable and gives answers within close proximity of the true values, even when other wells influence the pressure in the observation wells. The main requirement is that discernible (and preferably) isolated pulses be created at the source, when the property between the source and the observer is desired.

Figure 8:
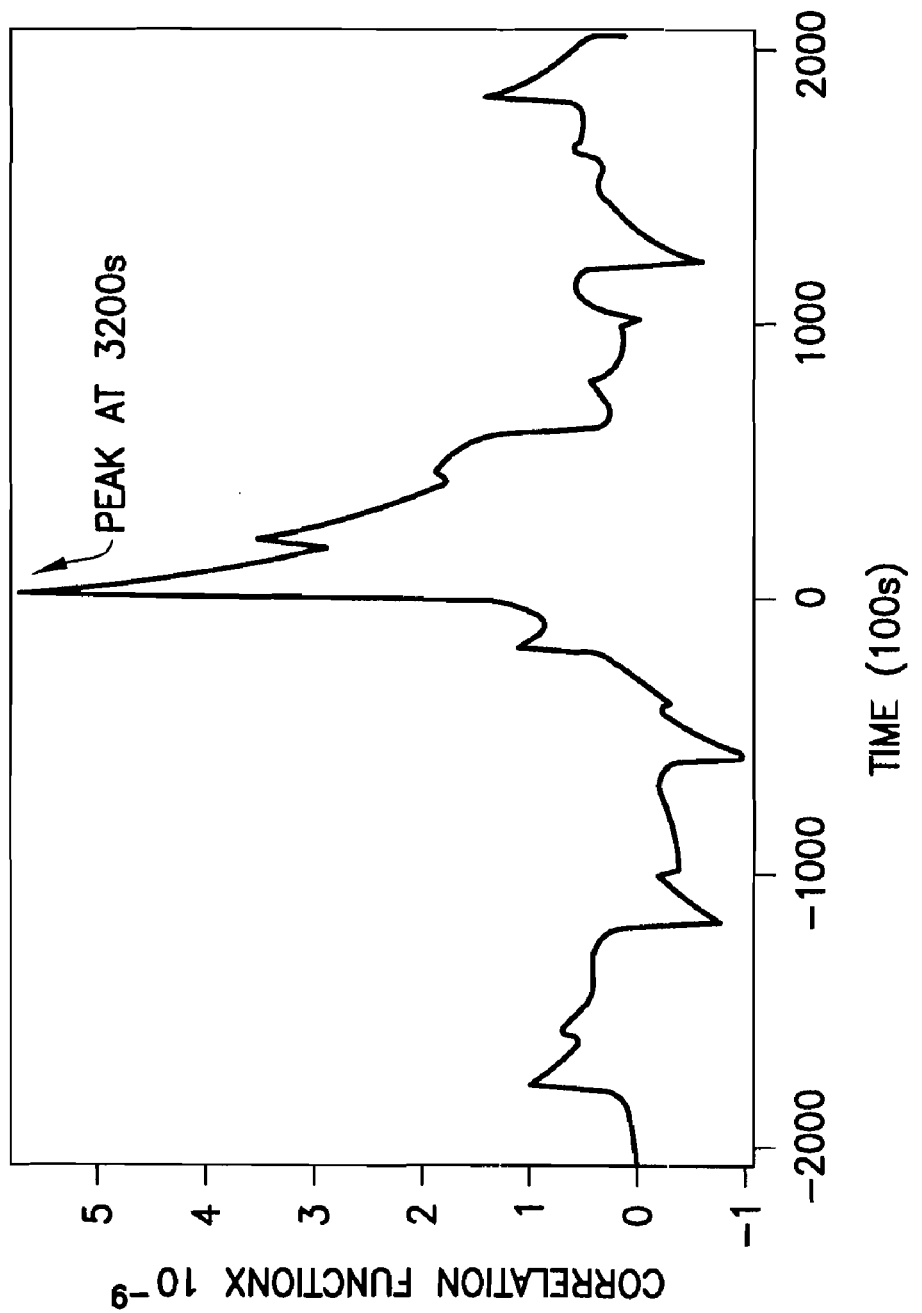
FIG. 8 is a graph showing correlation of pressure derivatives in wells 1 and 2.

The results of the correlation calculation between pressure derivatives in wells 1 and 2 are shown in FIG. 8. The location of the peak in this plot is at 3200 s (ignoring local fluctuations). This is the correlation time $t_c$. In carrying out this calculation, it is assumed that the pulsing at well 3 would have a negligible effect because well 1 dominates the well 2 response. Because the pulse widths are sufficiently large compared to the calculated $t_c$, it is assumed that $\eta_c$ should be close to $\hat{\eta}_c(X)$. Then, an estimate of the permeability between the two wells may be obtained from (X=400)

$$k = 0.9328 \frac{\phi \mu c X^2 r_w^2}{4 t_c} \qquad (27)$$

which gives 0.093 µm², sufficiently close to the original value. When the absolute peak is chosen in this example, a permeability of 85 mD is obtained, a good estimate. Interestingly, if $\eta_c = X^2$ was used in this example, the original permeability would have been recovered with a $t_c$=3200 s. The nature of the pulsing and the effect of the noise and the variations induced by well 3 probably caused this discrepancy. Also, note that the resolution on the time axis is limited to 100 s.

Figure 9:
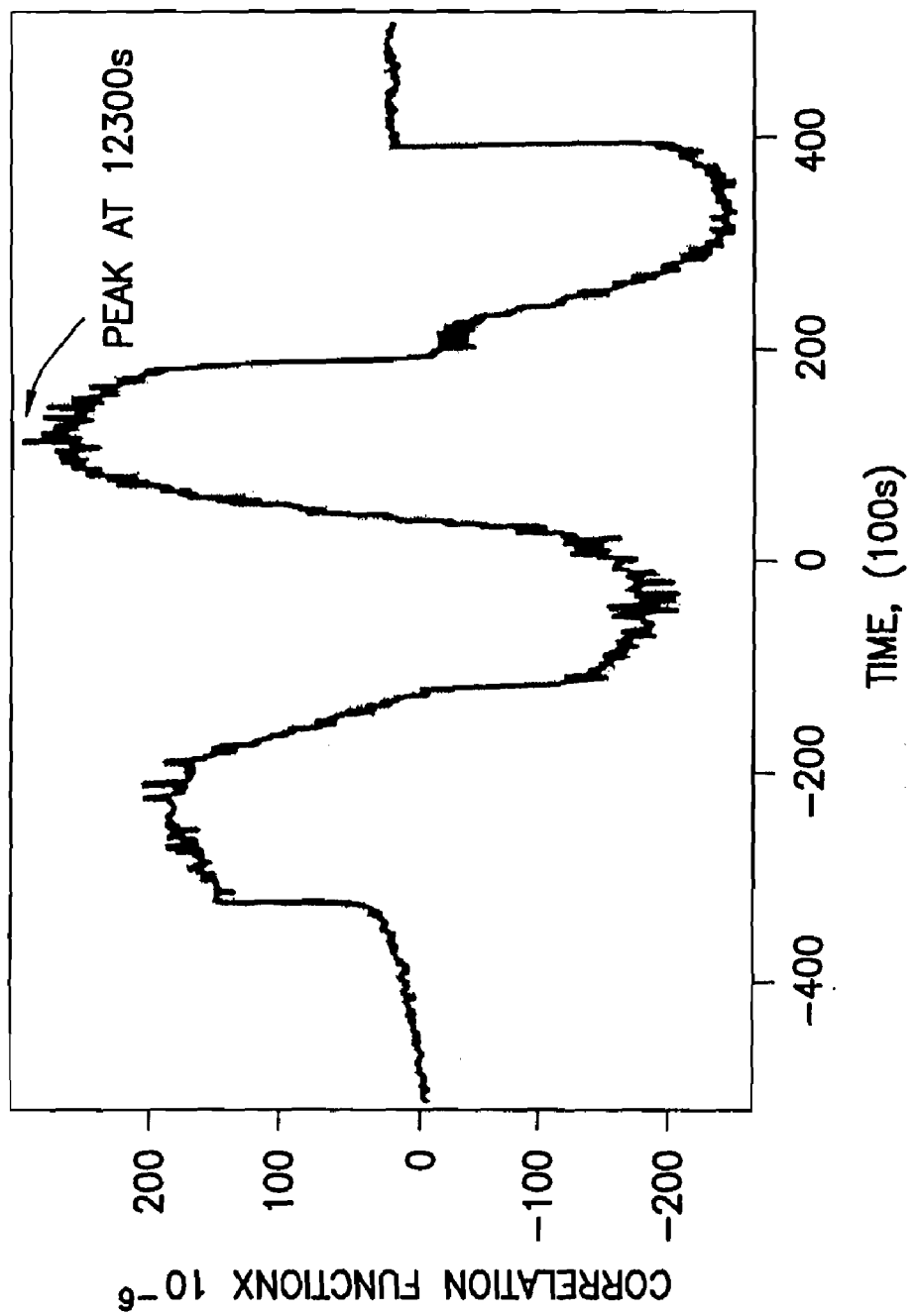
FIG. 9 is a graph of correlation pressure derivatives in wells 3 and 2.

For wells 2 and 3, the analysis is not as straight forward. If the entire data is considered, the peak in the correlation function is no longer reflective of the formation property. The distance between these two wells is 80 m and the interaction signal is dwarfed compared to the one between wells 1 and 2. For example, consider a pulse imposed by well 1 with no change in well 3. Then, both wells 2 and 3 experience a response corresponding to a distance of 40 m. These two signal changes are essentially the same in both the wells and will therefore have zero time displacement. In turn, a correlation of pressure derivatives will indicate infinite permeability between wells 3 and 2. Thus, interaction between distant wells will be adversely affected by more dominant intermediate wells. This could be circumvented by looking at a targeted window correlation function calculation. For example, in this case, a window around $10^5$ s where well 1 has no pulse could be chosen. A correlation function based on a window between 68000 s and 119100 s is shown in FIG. 9. The correlation function peak at 12300 s is in agreement with the diffusion time scale of 12800 s, yielding k=0.098 µm², quite close to the true permeability. The small effect of finite a is ignored here in estimating k. Thus, any automated pulsing sequence and windowing should be implemented so that the observation-active well interaction is the dominant one.

Example 2

Figure 10B:
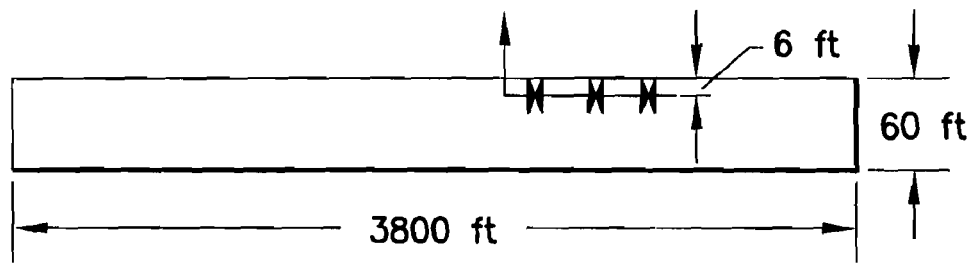

FIG. 10(*b*) shows the XZ cross-section of the hypothetical reservoir used in this example. The reservoir is 3800 ft long, 2250 feet wide and 60 ft thick. The pressure support comes from an aquifer connected to the XZ plane on the end of the reservoir, 1350 ft away from the well. The formation porosity is 15%. The viscosity of the water and oil are 0.5 cP and 20 cP, respectively. The 600 ft long horizontal producer is divided into 3 hydraulically isolated zones, 160 ft, 180 ft and 180 ft long respectively by packers. Within each zone, the flow can be independently controlled by a variable choke valve. The valve controls the flow from each annular zone into the common tubing. All zones are initially shut. A numerical simulator (Eclipse) was used to simulate a pressure transient created by opening zone 3 valve.

Figure 11A:
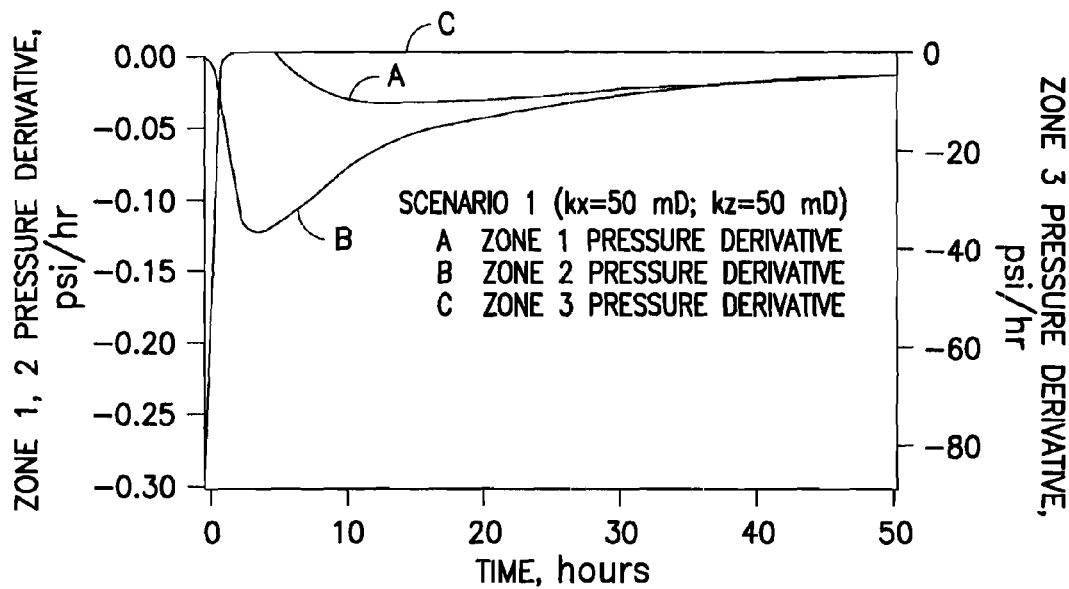
FIGS. 11(*a*) and 11(*b*) are graphs showing pressure derivative curves when zone 3 is opened for the two (2) reservoir model scenarios of Example 2.
Figure 11B:
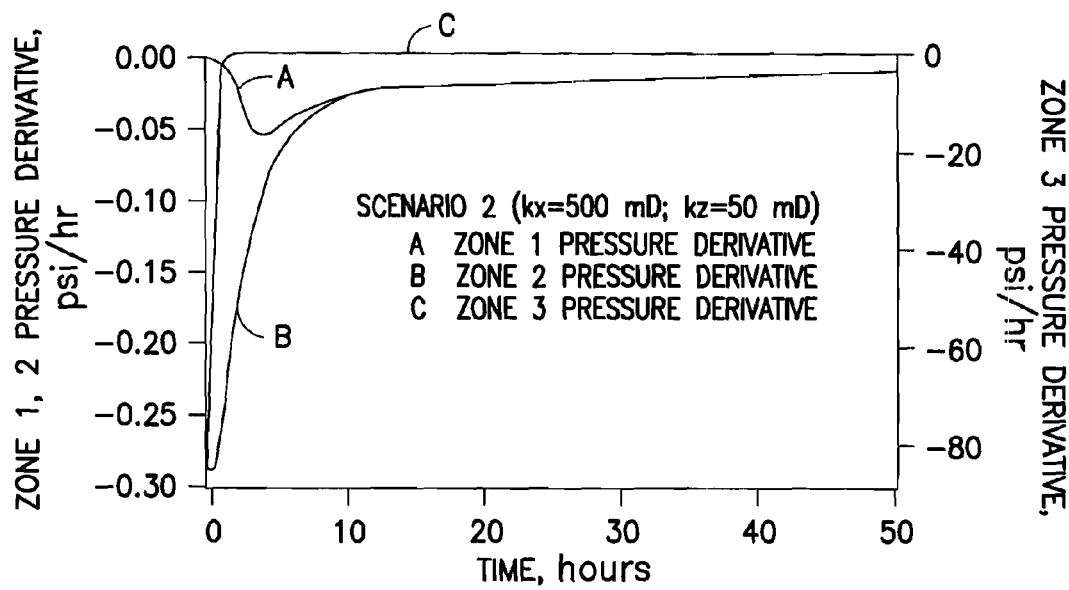

FIGS. 11(*a*) and 11(*b*) show pressure derivative responses of zone 1 (line A) and zone 2 (line B) when zone 3 (line C) is opened for two different reservoir model scenarios. The vertical permeability is 50 mD in both cases, however the horizontal permeability varies by a factor of 10. The response times and shape of the curve vary both with formation permeability and the distance from the pressure transient source. For zone 1 which is further away, the response is smaller and more diffused. For zone 3, the response is sharper and bigger. For both zones, the response is faster and sharper when the horizontal permeability is increased by a factor of 10. Thus, both the response time and the shape of the response curve give information on the formation region between the source and response locations.

Figure 12:
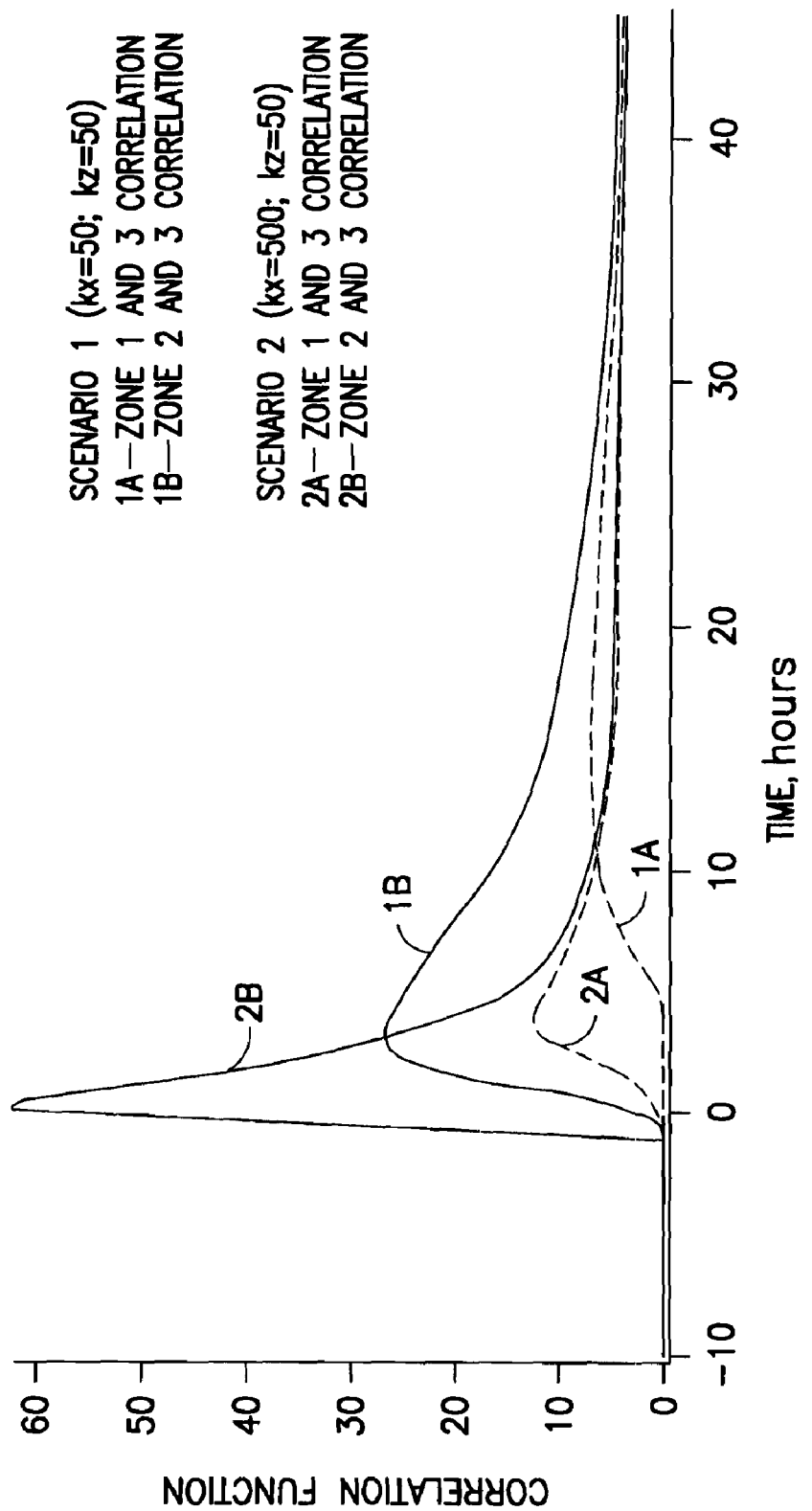
FIG. 12 is a graph showing the correlation functions for zone 3 pressure derivative with zone 2, and zone 1 pressure derivative for the two scenarios of Example 2.

FIG. 12 plots the correlation function for the pressure derivative of zone 3 with zones 1 and 2 for the two model scenarios (scenarios A and B). The shapes of the correlation function curves capture the different responses shown in FIGS. 11(*a*) and 11(*b*). For the zone 3-zone 2 pressure derivative correlation with scenario 2 (line 2B), the correlation time is determined to be between zero to 0.25 hours. The pressure data is computed every 0.25 hours. This, together with any numerical errors in data processing of discrete pressure data sets, can cause large error bars for the correlation time. For the pressure derivative correlation between zones 1 and 3 for scenario 1 (line 1A), the correlation function is diffused with no sharp peak identifiable. The correlation time is estimated to be in the range of 13.6-15.1 hours. These problems become more severe if there is random noise in the data. However, in such cases one could track the formation more robustly, if one were to track the shape of the curves as well. One way to parameterize the shape is to track the time at which the correlation function falls to a certain fraction of its peak value.

Table 2 below summarizes the correlation time and in addition the times at which the correlation function falls to 75%, 50% and 25% of its maximum peak height. For the zone 2 and 3 correlation for scenario 2, it is seen that the percentage error becomes lesser when looking for a time where the peak drops to 75% or 50% of its value (see Table 2). Note, that the assumptions used in derivation of Eq. 26 are no longer valid here because of the complex geometry as well as different mobilities of the oil and water. However, the correlation times and the other time parameters derived are still a function of oil and water mobility, compressibility and horizontal and vertical permeability. Hence, they will still afford a means of tracking changes in these quantities over time. They can also be used to constrain history matching with full-scale models.

TABLE 2

| Scenario | Time (hrs) | | | |
|---|---|---|---|---|
| | Peak | 75% | 50% | 25% |
| 1. kx = ky = 50 mD; kz = 50 mD | 3.25 | 8.24 | 12.98 | 27.82 |
| 2. kx = ky = 500 mD; kz = 50 mD | 0-0.25 | 1.37 | 2.67 | 4.87 |

Example 3

Figure 13A:
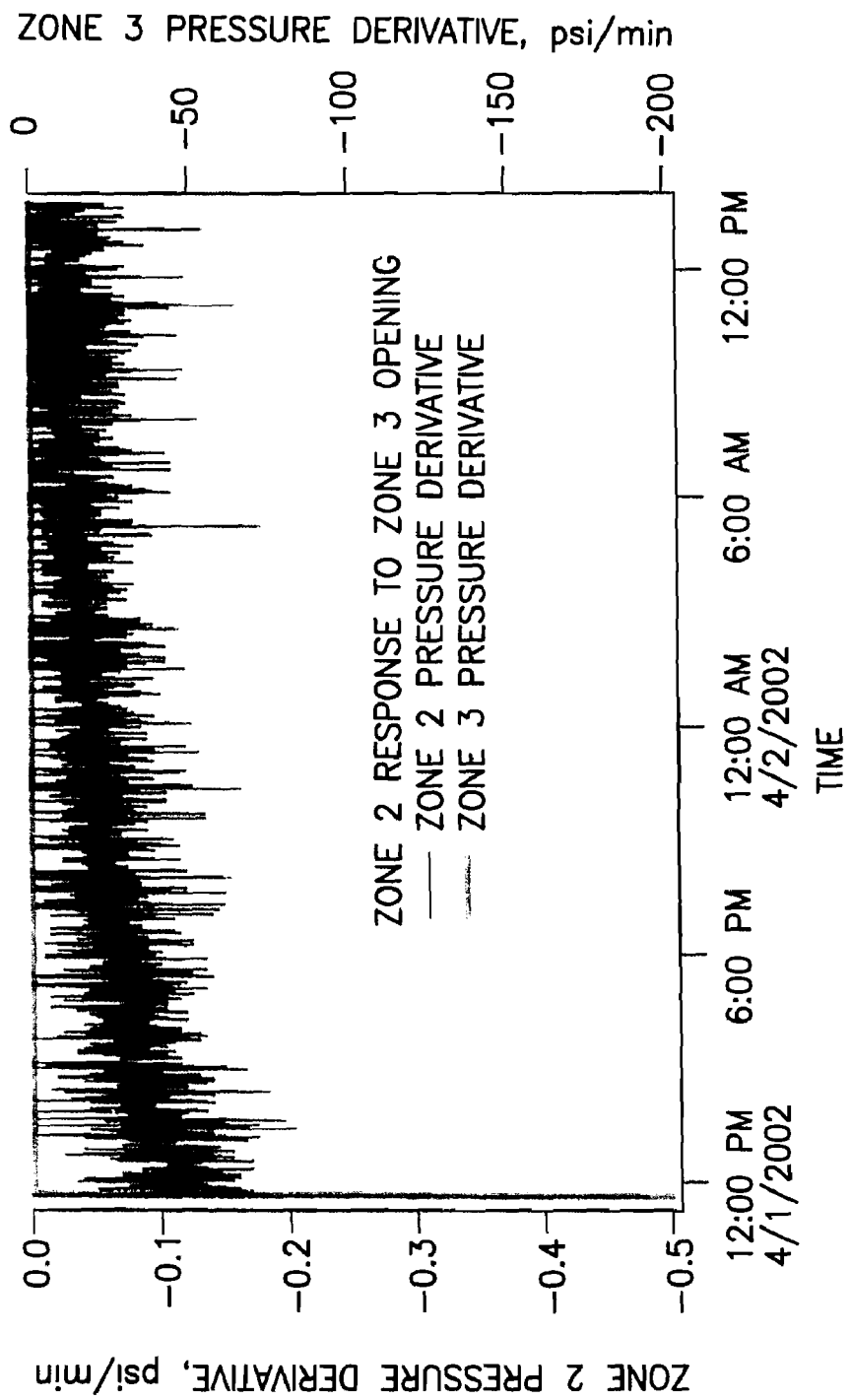
FIGS. 13(*a*) and 13(*b*) are graphs showing annular pressure derivatives (pressure differences over 5-minute intervals) for zones 2 and 3 of Example 3.
Figure 13B:
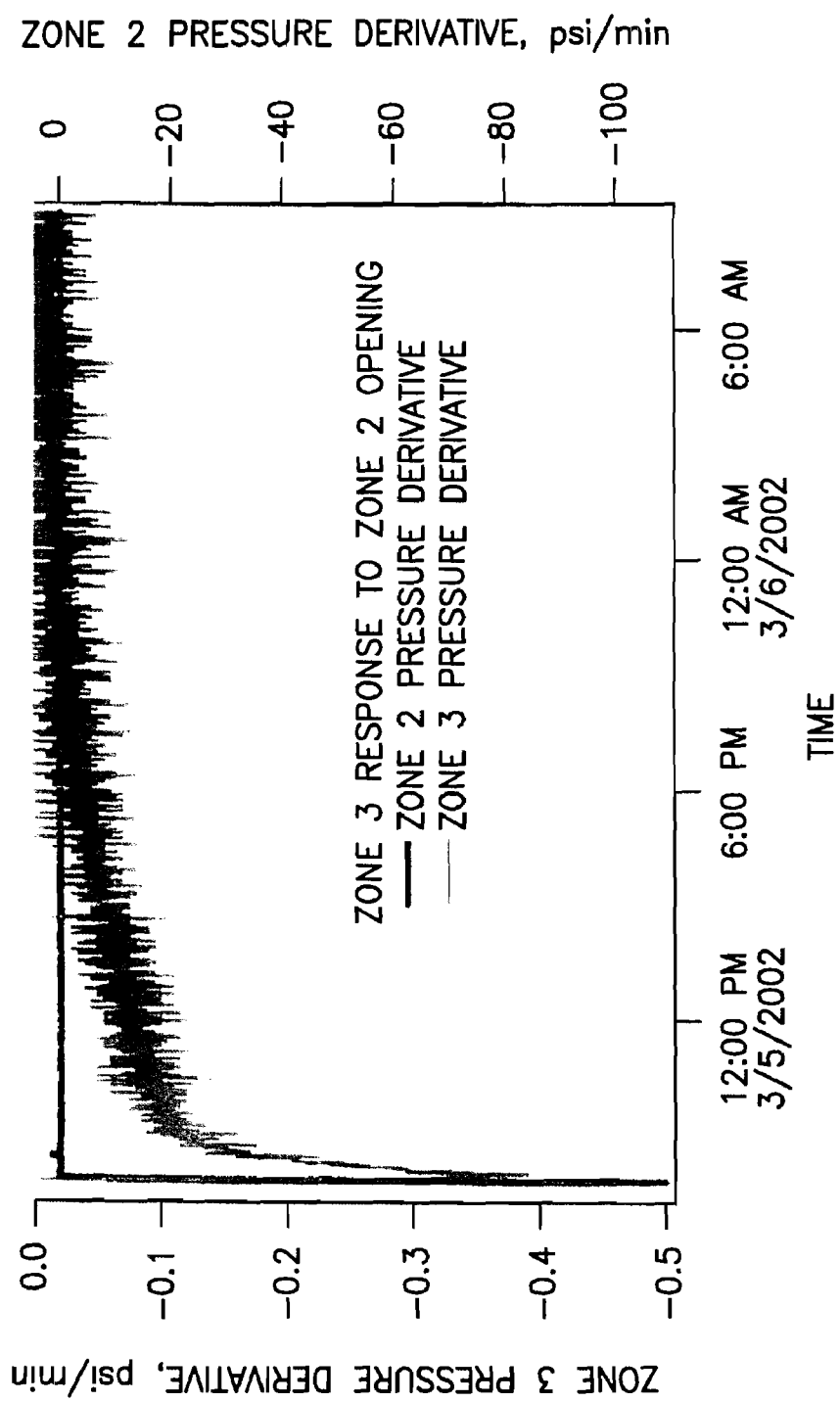

This Example illustrates the utility of this approach using real pressure data from a producing well. Details of the well and the reservoir are given in Bryant et al. (2002). FIGS. 13(a) and 13(b) show that the pressure derivative response of zone 2 to zone 3 opening is very different from the reverse case of zone 3 response to zone 2 opening. FIG. 13(a) shows the zone 2 response when zone 3 was opened after a shut-in. This is smaller and diffused as compared to the zone 3 response to opening after a shut-in shown in FIG. 13(b).

Figure 14A:
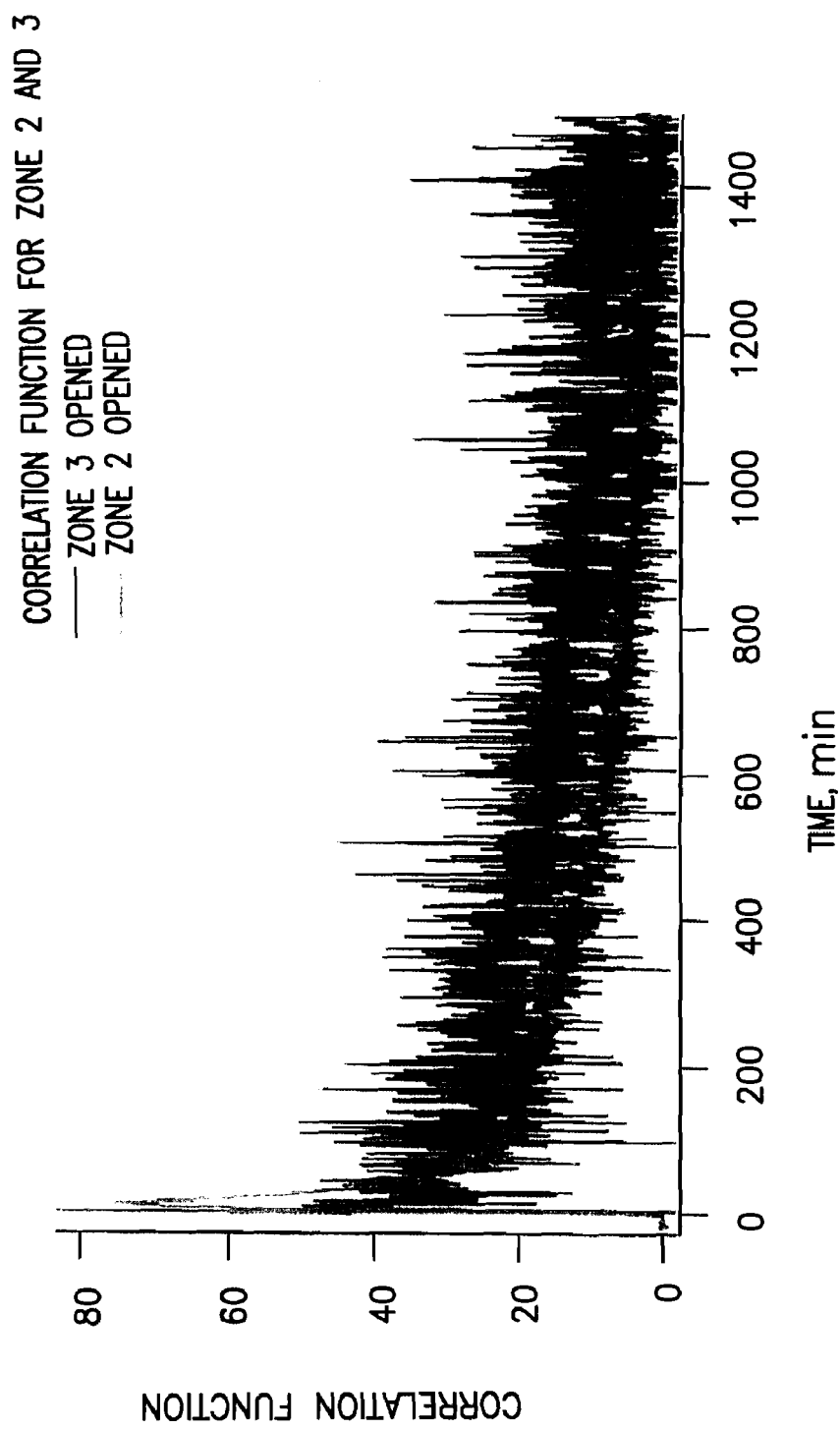
FIGS. 14(*a*) and 14(*b*) are graphs showing: (a) the correlation function of zone 2 and zone 3 pressure derivatives (Example 3) when zones are opened individually after a shut-in and (b) a detailed look at early times of FIG. 14(*a*).
Figure 14B:
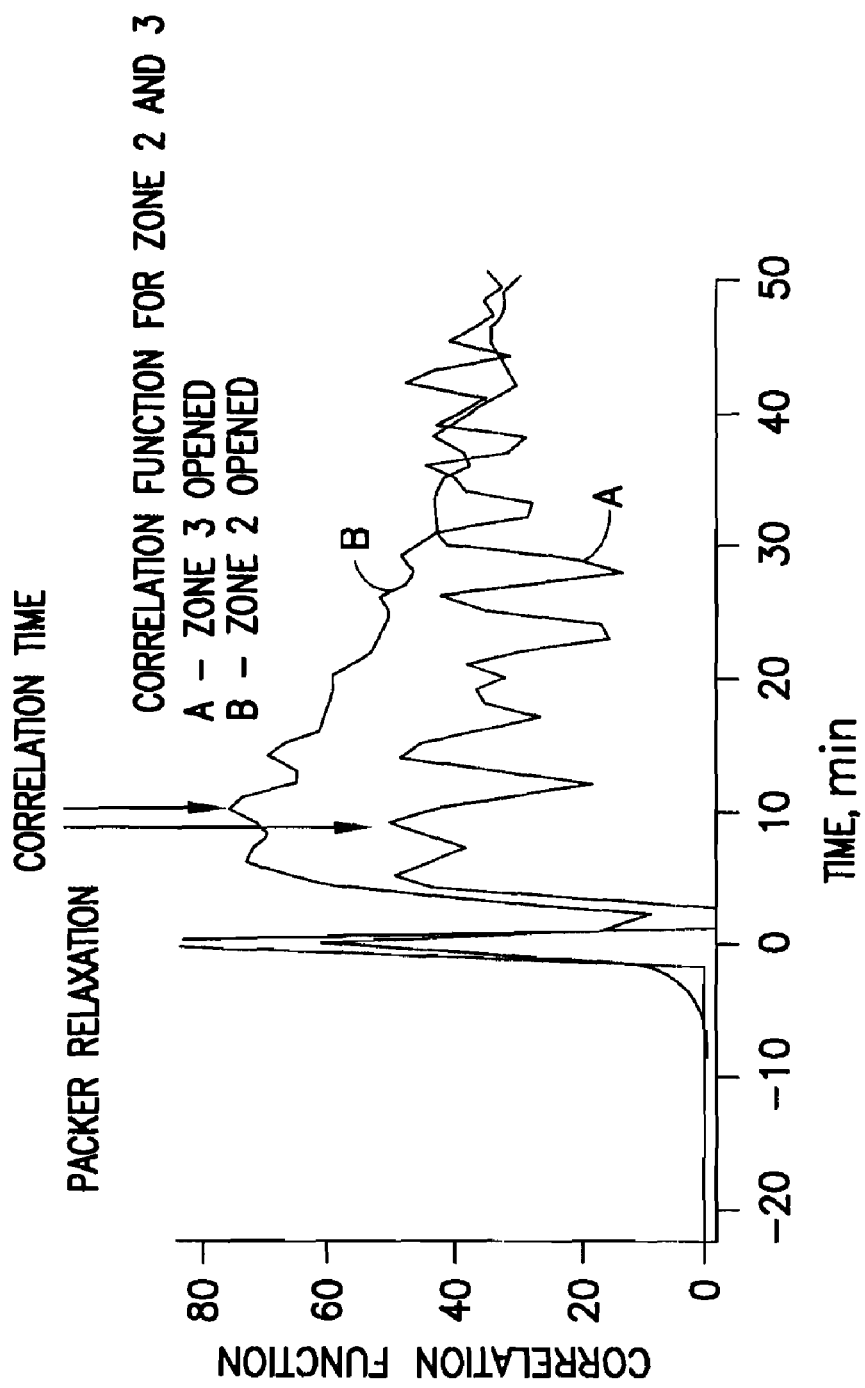

FIG. 14(a) shows the correlation function for the pressure derivatives in these two zones for the two tests. FIG. 14(b) shows a more detailed view of FIG. 14(a) at early times. (The arrows indicate correlation times for the two tests.)

Both plots show a peak at time 0 min which corresponds to relaxation of a hydraulic fluid filled rubber packer that is isolating the two zones. The data acquisition interval here is 1 minute. The correlation peak for the zone 3 response (line A) is at 10 min. It is harder to identify the peak for the zone 2 response (line B). The first big peak however is at 9 minutes very close in value to the zone 3 response peak. This is to be expected as the path connecting the two zones is the same in either test and the pressure travel time should be equal. However, it is very evident that the response of zone 3 to zone 2 opening is very sharp, while that of zone 2 is very broad and diffuse.

Figure 15:
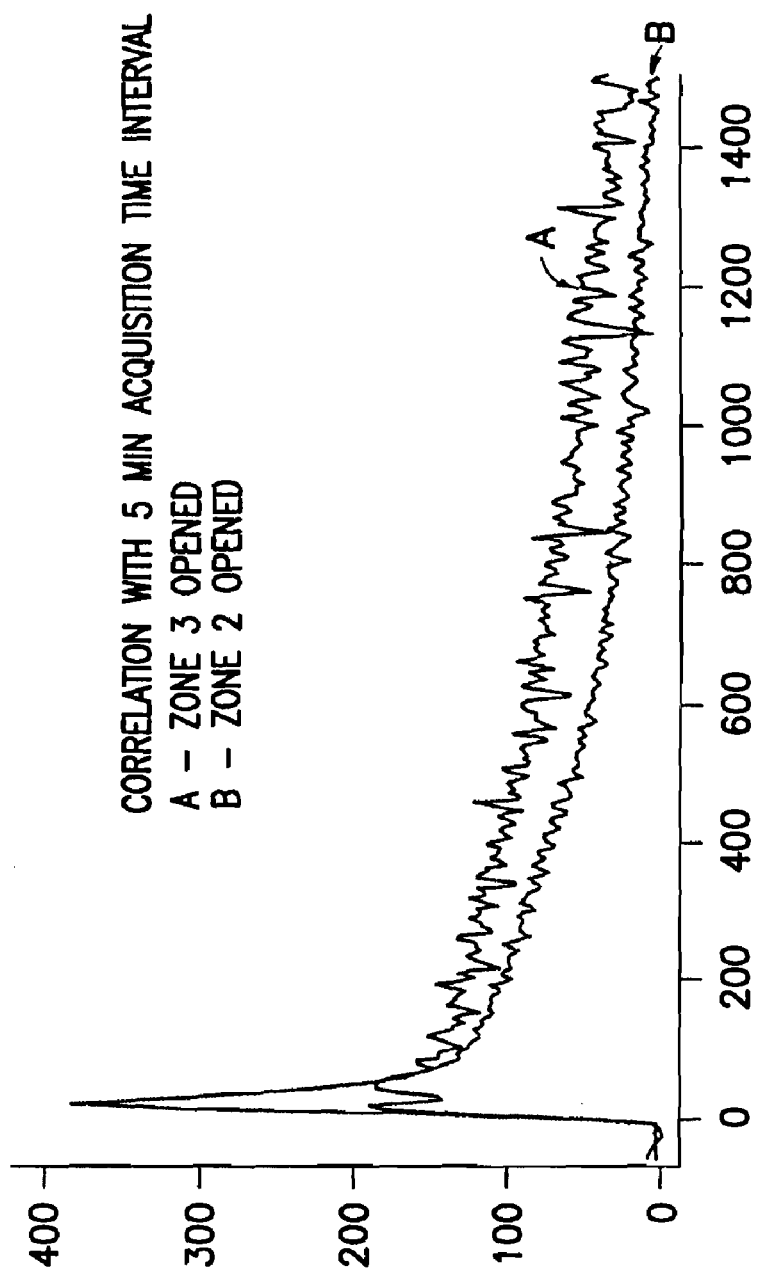
FIG. 15 is a graph showing the correlation function of zone 2 and zone 3 pressure derivatives of Example 3.

The difference in the shape indicates that the formation is changing in some way depending on the source of the pressure pulse. The correlation time alone would not reveal this information. The shape together with the correlation time is a much better constraint for the forward model. FIG. 15 shows the correlation plots when the frequency of data points is reduced to 1 in 5 minutes. In this figure, line A represents zone 3 opened and line B represents zone 2 opened. The correlation plot is much less noisier but correlation time accuracy is lost because of lower time resolution. The correlation peak is at 10 minutes for both (note that error in estimating correlation time is of the order of +/−5 min here as compared to +/−1 min in FIG. 14). Note also that the peak at zero time corresponding to packer relaxation is not there in FIG. 15 again due to loss in data frequency.

Effect of Storage. Much of the above discussion assumes an ideal pulse shape, i.e., a rapid rise to a fixed flow rate and a reduction at a later time. When such a flow rate is imposed at the surface, wellbore storage will slow the rise to the final rate. To take this into account, the conservation equation within the well is combined with that of the formation. The prescription for the correlation time involves an additional parameter related to the storage equations.

For the discussion below, it is assume that a cemented observation well is used so no storage at the observation point needs to be considered.

The pressure equation for the formation remains the same as Eq. 2. Conservation of fluid mass within the wellbore at the source gives (see Raghavan (1970) and van Everdingen et al., "The application of the laplace transformation to flow problems in reservoirs," Trans. AIME (1949), volume 186, pages 305-324, incorporated herein by reference in its entirety)

$$-\lim_{r \to 0} 2\pi r h \frac{k}{\mu} \frac{\partial p}{\partial r} = Q\delta(t) - V_w c_w \frac{dp_s}{dt} \quad (28)$$

here the variables with subscript w denote wellbore values of the source. Here, the wellbore fluid may have a different compressibility $c_w$ than that of the formation fluid. The coefficient $$\frac{V_w c_w}{2\pi \phi r_w^2 h c}$$

is the dimensionless storage constant ($\beta$). This may be arrived at by choosing a characteristic distance of $r_w$ and a time-scale of $$\frac{\phi \mu c r_w^2}{k}.$$

Whenever the dimensionless time is large compared to $\beta$, storage effects become unimportant for the flow rate establishment at the source well. Given that the characteristic dimensionless time for correlation between the wells is $X^2$ (note that $t_c/T$ is actually $\approx X^2/4$), in the absence of storage, for $\beta << X^2$, the influence of storage in altering the correlation time is likely to be small. For practical situations, this is satisfied even for an observer at a distance of 20 m. In terms of dimensionless quantities such as $\eta_c$, the problem is simply governed by two parameters, X and $\beta$. The effect of $\alpha$ is assumed to be negligible for a sufficiently large compared to $\eta_c$.

The forward problem for computing pressure transients is easy to solve: one combines the wellbore boundary condition of Eq. 28 with the diffusion equation. But a scheme for providing a real-time interpretation of permanent monitoring results is developed. A simple prescription for correcting for the effect that storage on the correlation time is therefore desired.

Real-time interpretation with storage. In its most rudimentary form, the present approach assumes that the effect of wellbore storage may be adequately represented by an exponential approach to the surface rates. That is, given an imposed rate of q(t)=H(t) at the surface, it is assumed that a good approximation to the ratio of the bottom rate to the surface rate is (see Kuchuck, "A new method for determination of reservoir pressure," SPE paper 56418 at the SPE Annual Technical Conference and Exhibition, Houston, Tex. (1999), incorporated herein by reference in its entirety)

$$\frac{q_b(t)}{q(t)} = \left(1 - \exp\left[-\frac{t}{T_s}\right]\right) \quad (29)$$

Obviously, the true bottom rate is not accurately represented by this form because the solutions to the differential equation Eq. 2 and 28 is not given by Eq. 29. The intention here is simply to have an adequate numerical representation of the effect of storage. The interpretation procedure would therefore estimate $T_s$ by knowing bottom and surface rates through standard least square procedures, which may be performed rather rapidly. Once $T_s$ is estimated, a direct correlation of differentiated pressure data (for pulse width sufficiently large) should give a value for the actual correlation time ($t_{ca}$).

Assuming that the true correlation time is $t_{cr}$ (i.e., the correlation time that would have been obtained if $T_s=0$, with an impulse rate i.e., $\eta_c=\hat{\eta}_c(X)$), then two dimensionless variables $t_{cr}/t_{ca}$ and $T_s/t_{ca}$ can be constructed. Because these are dimensionless time scales, the dependency between them should change only with X, the other dimensionless parameter.

To establish this relationship, several numerical exercises in which three finite width pulses were imposed at a source well with observations made at a distant well were carried out. The observer distance was changed to establish dependency on X as was T. The final result of the entire numerical exercise is shown in FIG. 16.

Figure 16:
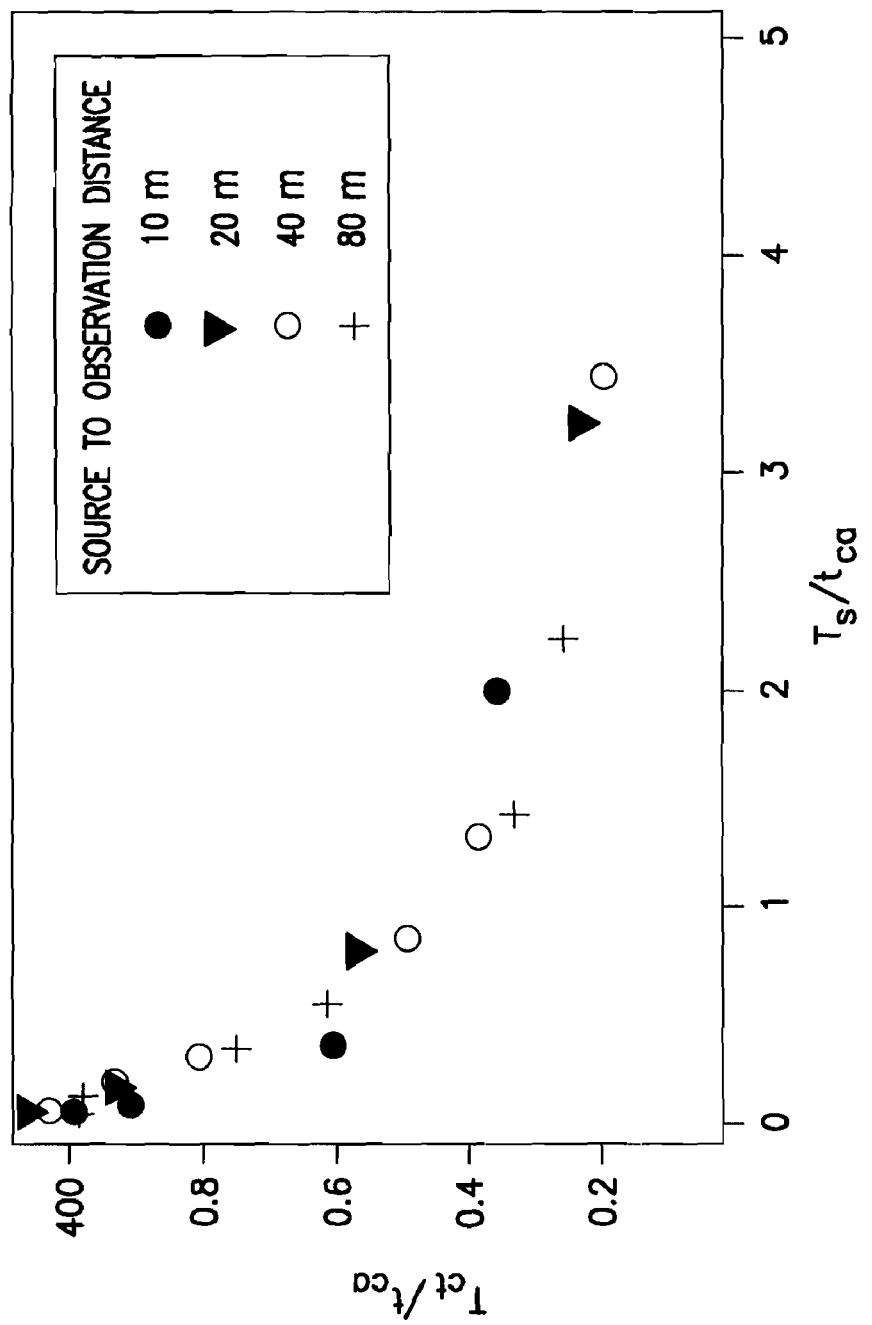
FIG. 16 is a graph showing the effect of storage on peak correlation time and its variation with source-observer distance.

FIG. 16 illustrates how storage may be removed in the forward calculations. A notable feature is that the source-observer dependency is virtually absent. This result is expected, given the flattening of $\hat{\eta}_c(X)$ for practical values of X. In the actual interpretation of this figure, one computes $T_s$ and $t_{ca}$ from the measured data for a pulse experiment, and reads the ordinate value. The ordinate when multiplied by $t_{ca}$ gives the correlation peak time in the absence of storage, and from which diffusivity may be estimated as per previous sections. Thus, the inverse problem is solved without extensive iteration based optimization.

FIG. 17 illustrates a flow chart of at least one method for monitoring one or more characteristic of a region of a earth formation over time so as to provide reservoir characterization for reservoir management. FIG. 17 discloses the method comprising of the steps of: (a) obtaining source pressure pulses at one or more location in a source well so as to gather source pressure pulse data; (b) obtaining observer pressure data at one or more location in an observer well, wherein said observer pressure data may be correlated to said source pressure pulse data; (c) repeating (a) and (b) one or more times; (d) developing a correlation between said source pressure pulse data and said observer pressure data as a function of time, wherein said correlation is based on a function governed by pressure diffusion; (e) determining the time location of the maximum value of said correlation and analyzing the decay of said maximum value over time so as to gather correlation time data; (f) using said correlation time data to obtain pressure diffusivity between the at least one source well and the at least one observer well and using the pressure diffusivity to estimate inter-well permeability, so as to monitor at least one characteristic such as permeability from the one or more characteristic of the region of said earth formation so as to gather monitored permeability data; and finally the step of (g) storing said monitored permeability data.

While the invention has been described herein with reference to certain examples and embodiments, it will be evident that various modifications and changes may be made to the embodiments described above without departing from the scope and spirit of the invention as set forth in the claims.

What is claimed is:

1. A method for monitoring one or more characteristic of a region of a earth formation over time so as to provide reservoir characterization for reservoir management, comprising:
    a. obtaining source pressure pulses at one or more location in a source well so as to gather source pressure pulse data;
    b. obtaining observer pressure data at one or more location in an observer well, wherein said observer pressure data may be correlated to said source pressure pulse data;
    c. repeating (a) and (b) one or more times;
    d. developing a correlation between said source pressure pulse data and said observer pressure data as a function of time, wherein said correlation is based on a function governed by pressure diffusion;
    e. determining the time location of the maximum value of said correlation and analyzing the decay of said maximum value over time so as to gather correlation time data;
    f. using said correlation time data to obtain pressure diffusivity between the at least one source well and the at least one observer well and using the pressure diffusivity to estimate inter-well permeability, so as to monitor at least one characteristic such as permeability from the one or more characteristic of the region of said earth formation so as to gather monitored permeability data; and
    g. storing said monitored permeability data.

2. The method of claim 1, further comprising correcting said correlation time for storage effects at said source well.

3. The method of claim 1, further comprising correcting said correlation time for the distance between said observer well and said source well.

4. The method of claim 1, further comprising correcting said correlation time for the width of said source pressure pulses.

5. A method of monitoring permeability of a region of earth formation over time so as to assist with reservoir management, comprising:
    a. inducing one or more pressure pulses at one or more location in at least one source well, wherein data on said induced pressure pulses is gathered and referred as induced pressure pulse data;
    b. measuring pressure data at one or more location in at least one observer well, wherein said pressure data includes pressure pulses having diffused through at least a portion of said earth formation whereby diffused pressure pulse data is gathered;
    c. repeating (a) and (b) one or more times;
    d. developing a correlation between said induced pressure pulse data and said diffused pressure pulse data as a function of time so as to gather correlation time data; and
    e. analyzing said correlation time data to obtain pressure diffusivity between the at least one source well and the at least one observer well and using the pressure diffusivity to estimate interwell permeability, so as to monitor the permeability of the region of earth formation and gather monitored permeability data.

6. The method of claim 5, wherein said correlation is based on a function governed by pressure diffusion.

7. The method of claim 5, further comprising analyzing the shape of said correlation over time.

8. The method of claim 5, wherein said induced pressure pulse data is flow data and said diffused pressure pulse data is pressure data.

9. The method of claim 5, further comprising repeating (a), (b) and (c) for more than one observer well.

10. The method of claim 5, further comprising repeating (a), (b), and (c) for more than one source well.

11. The method of claim 5, further comprising determining the time location of the maximum value of said correlation and analyzing the decay of said maximum value over time.

12. The method of claim 11, wherein said correlation is governed by pressure diffusion, and wherein at least one of said one or more characteristics is permeability.

13. The method of claim 5, wherein said induced pressure pulse data is differentiated pressure data and said diffused pressure pulse data is differentiated pulse pressure data.

14. The method of claim 13, wherein said differentiated pressure data is a time derivative of pressure data at the at least one source well and said differentiated pulse pressure data is a time derivative of pressure data of the at least one observer well.

15. The method of claim 5, wherein said induced pressure pulse data gathered at the at least one source well and said diffused pressure pulsed data gathered at the at least one observer well is differentiated pressure data.

16. The method of claim 15, further comprising correcting said correlation time for storage effects at said at least one source well.

17. The method of claim 15, further comprising correcting said correlation time for the distance between said observer well and said at least one source well.

18. The method of claim 15, further comprising correcting said correlation time for the width of said induced pressure pulses.

* * * * *